(12) United States Patent
Cage

(10) Patent No.: US 7,963,859 B2
(45) Date of Patent: Jun. 21, 2011

(54) METHOD AND APPARATUS FOR ASSISTIVE ENERGY TYPE GOLF CLUB

(76) Inventor: Donald R. Cage, Longmont, CO (US)

( * ) Notice: Subject to any disclaimer, the term of this patent is extended or adjusted under 35 U.S.C. 154(b) by 0 days.

(21) Appl. No.: 12/706,956

(22) Filed: Feb. 17, 2010

(65) Prior Publication Data

US 2011/0081980 A1 Apr. 7, 2011

Related U.S. Application Data

(63) Continuation of application No. 11/530,163, filed on Sep. 8, 2006, now Pat. No. 7,731,602.

(51) Int. Cl.
*A63B 53/00* (2006.01)

(52) U.S. Cl. ........ 473/324; 473/221; 473/222; 473/223; 473/224; 473/234; 434/1; 434/2; 434/3; 434/4; 434/252

(58) Field of Classification Search .................. 473/221, 473/222, 223, 224, 234, 324, 333; 434/1–10, 434/252
See application file for complete search history.

(56) References Cited

U.S. PATENT DOCUMENTS

| | | | | |
|---|---|---|---|---|
| 5,082,276 A * | 1/1992 | Stevens | ......................... | 473/223 |
| 5,522,594 A * | 6/1996 | Taylor et al. | .................. | 473/131 |
| 5,709,610 A * | 1/1998 | Ognjanovic | .................. | 473/223 |
| 5,779,555 A * | 7/1998 | Nomura et al. | ............... | 473/223 |
| 5,816,927 A * | 10/1998 | Taylor | ........................... | 473/131 |
| 5,971,864 A * | 10/1999 | Joshi et al. | .................... | 473/219 |
| 6,441,745 B1 * | 8/2002 | Gates | ........................... | 340/669 |
| 6,872,148 B2 * | 3/2005 | Lee | ................................ | 473/131 |
| 2002/0171415 A1 * | 11/2002 | Lim | ............................. | 324/176 |
| 2005/0037862 A1 * | 2/2005 | Hagood et al. | ............... | 473/345 |
| 2005/0076161 A1 * | 4/2005 | Albanna et al. | ................. | 710/15 |
| 2005/0215340 A1 * | 9/2005 | Stites et al. | .................... | 473/233 |
| 2006/0025229 A1 * | 2/2006 | Mahajan et al. | ............... | 473/131 |

* cited by examiner

*Primary Examiner* — David L Lewis
*Assistant Examiner* — Chase Leichliter
(74) *Attorney, Agent, or Firm* — Duft Bornsen & Fishman LLP

(57) ABSTRACT

Apparatus and a method that enables an assistive energy type golf club to sense the approach of the club face toward a golf ball, and to trigger the release of the assistive energy at the optimum time to achieve the desired golf ball velocity and distance.

11 Claims, 23 Drawing Sheets

METHOD AND APPARATUS FOR ASSISTIVE ENERGY TYPE GOLF CLUB

RELATED PATENTS

The patent application is a continuation of a co-pending U.S. non-provisional patent application Ser. No. 11/530,163 filed 8 Sep. 2006 and identically entitled, which is hereby incorporated by reference.

FIELD OF THE INVENTION

The present invention relates to method and apparatus adapted for use with an assistive energy type golf club to enable the release of assistive energy at the optimum time from a golf club head to a golf ball.

Problem

Methods and apparatus are known for applying assistive energy to add incremental velocity to a golf ball. The purpose of these devices is to assist a golfer that is unable to execute a full golf swing due to some physical impairment such as arthritis, back injury, muscle soreness, pain, etc.

A golf club using assistive energy in the form of a compressed spring is shown in U.S. Pat. No. 769,939 to Clark, where the club is swung in a normal manner. When the club face strikes the ball, the spring energy is released to add its energy to the acceleration of the golf ball.

U.S. Pat. No. 4,170,357 to Greer describes a golf club head where the assistive energy is in the form of an explosive charge. The club is swung in a normal manner, and when the club face strikes the ball, the impact triggers a firing pin to detonate the explosive charge which then adds its energy to the acceleration of the golf ball.

Both of these above patents require the club face to hit the ball to release the assistive energy. This is a problem since the optimum time to initiate the assistive energy release is not upon impact of the club face with the ball but at a time prior to ball impact. The optimum time period is usually several milliseconds prior to ball impact. The time period between initiating assistive energy release and the ball impacting the club face is hereinafter referred to as trigger delta-t.

For example, a physically fit golfer might swing a driver with a club head velocity of about 175 feet per second which, after impact, could result in a ball velocity of around 225 feet per second. Depending on the loft of the club face, weather and other conditions, a ball driven at this velocity could carry a distance of 250 yards or more. This would be considered a good drive velocity and distance.

A physically impaired golfer might only be able to swing a driver with a club head velocity of, for example, 50 feet per second or less. Since the inherent time delay between giving the firing command to release assistive energy, and optimal energy transfer to the ball may be 2 milliseconds or more, the club head would travel a full 1.2 inches during that time. Since a golf ball normally is only in contact with the club face for about 0.5 milliseconds, waiting until the ball contacts the club face to initiate assistive energy release does not work effectively since the ball would have already bounced off the surface of the club face and would be moving down range at a low velocity before the assistive energy could be released.

One method of solving this problem is to not swing the club at all, but simply place the club in front of the ball and then initiate the energy release. This completely eliminates the problem of timing the energy release for maximum effect. U.S. Pat. No. 5,522,594 to Taylor et al, and assigned to the Swingless Golf Corporation, describes such an invention whereby a golf club using an explosive charge as the assistive energy, is placed in front of a golf ball, and by pressing buttons on the handle, the explosive charge is detonated to drive a piston to impact the ball. The problem with this solution is that it only helps those golfers who cannot or do not wish to swing a club at all. Physically impaired golfers who can still swing a club somewhat generally prefer to use a club which requires some amount of swing since swinging a club encompasses the true spirit and essence of golfing.

Solution

The present invention solves the aforementioned and other problems of timing the assistive energy release for optimum golf ball velocity and distance, while still allowing a physically impaired golfer to swing the club somewhat in a manner similar to a normal golf swing.

The disclosed apparatus embodying the present invention is adapted for use with an assistive energy type golf club and includes sensing apparatus and signal processing apparatus, which together determine the optimum time to initiate the firing command prior to ball impact. This optimum time is hereinafter referred to as the pretrigger time. This pretrigger time is based on an approach parameter such as the time to ball impact, or the distance between the ball and the club head, or some other approach parameter that can be measured or determined during the swing of the golf club. Signal processing can be done a number of ways as later described by several examples.

One of the simplest exemplary embodiments of the present invention comprises a golf ball proximity sensor which senses the distance between the club face and the golf ball. The distance between the club face and the golf ball is used as the approach parameter to determine the pretrigger time. The signal processing apparatus gives the firing command when the distance between the club face and the golf ball reaches a predetermined value during the downswing.

Another apparatus embodying the present invention includes a sensor which senses the distance and the velocity of the club face toward the ball. The signal processing apparatus then predicts the time when the club face will impact the ball as the approach parameter and uses this information in combination with predetermined club characterization information to determine the optimum pretrigger time to initiate the firing command. This pretrigger time is in advance of ball impact by a delta-t time period of several milliseconds or more and is a function of several variables including the approach velocity of the club face toward the ball, the time delays inherent in the energy release sequence, the desired golf ball velocity, and others.

The present invention can be used with any assistive energy type golf club head such as an explosive charge type, a compressed spring type, compressed gas type, or others. The type of assistive energy and the design of the club head determine the inherent time delays in releasing assistive energy to add incremental velocity to the ball. Typical causes of delay times include charging an electromagnetic coil to release a firing pin, or to open a solenoid valve, hysteresis in mechanical linkages, building up pressure behind a piston, accelerating a piston up to a desired velocity prior to striking the ball, electronic signal processing delays, and others. The total sequence of events can be several milliseconds or more. These delays make an enormous difference in the resulting ball velocity and distance.

One exemplary embodiment of the invention includes sensing and signal processing apparatus to determine the club head velocity and time of ball impact. This is achieved by sensing the relative distance and associated time between the ball and club face during a downswing by using an ultrasonic type sensor. Many types of sensors can be used for this purpose including laser type, radar type, accelerometer type, metal detector type, magnetic type, contact type, light emitting diode type, and others. The details of the sensor may vary so long as it, along with signal processing apparatus, can determine the pretrigger time or pretrigger distance to give the firing command prior to ball impact.

In another exemplary embodiment, accelerometers are used to sense club motion and thereby determine club head velocity and distance to the ball and time of ball impact. In another exemplary embodiment of the invention, metal detection methods are used to sense golf ball proximity for a golf ball or tee having a metal core. In another exemplary embodiment of the invention, magnetic sensors are used to sense motion when either the ball or the tee creates a magnetic field. In another exemplary embodiment of the invention, the proximity of the ball is sensed by physical contact with a sensor positioned in front of the club face and prior to impact of the ball with the club face.

The apparatus embodying the invention can include memory storage for information such as the clubs inherent time delays, program instructions, algorithms, and information about the desired golf ball velocity or distance, the advance trigger distance and others. This information is then used to determine the optimal pretrigger time or pretrigger distance to initiate the firing command.

The signal processing apparatus can be any type of information processor such as a Texas Instrument TMS320-C2000 series type digital signal processor (DSP) or the like. Inherent delays are pre-determined by performance testing of the club. By measuring resulting ball velocity or distance as a function of club head approach velocity and trigger delta-t, data are collected, which accurately predicts the resulting golf ball velocity or distance as a function of these parameters. The desired golf ball velocity or distance could be a fixed value or alternately, a user specified value that can be input so that a specified ball velocity or distance will be achieved rather than a fixed one. Alternatively, an approximate ball velocity or distance can be achieved by giving the firing command at a pretrigger time based on a specified distance between the ball and the club head prior to ball impact as the approach parameter without taking club head approach velocity into account. Either time or distance to ball impact, or some other approach parameter can therefore be used to determine the optimum pretrigger time to give the firing command.

Either a desired resulting ball velocity or distance can be used or specified since there is a relationship between the two parameters. The distance traveled by a golf ball is dependant on its initial velocity and loft angle, and other parameters not controlled by the present invention including swing accuracy, ball rotational velocity, air density, humidity, wind and others.

Finally the method and apparatus embodying the invention further includes apparatus for initiating a firing command to begin a sequence of events leading up to assistive energy release and ball impact. This is usually in the form of an electrical signal from a digital to analog converter (DAC) that activates a trigger mechanism. An example of a trigger mechanism is an electromagnetic coil to release a firing pin toward an explosive charge detonator. Another example of a trigger mechanism is a solenoid valve to release compressed gas pressure toward a piston, etc.

Aspects

An aspect of the invention comprises apparatus adapted to control the operation of an assistive energy golf club head during a swing by a user of a golf club coupled to said golf club head; said apparatus including:

sensor apparatus adapted to sense the travel of said golf club head relative to a golf ball, signal processing apparatus effective during said swing and prior to the impact of the club face of said golf club head with said golf ball to generate a firing command under control of an approach parameter;

velocity generating apparatus including said golf club head responsive to said generation of said firing command to apply assistive energy from said golf club face to said golf ball; and said assistive energy is effective to apply incremental velocity to said golf ball.

Preferably said approach parameter is based on a predicted impact time of said golf club face with said golf ball or, alternatively, is based on the present distance between said golf club face and said golf ball.

Preferably said apparatus further comprising an assistive energy source for applying said assistive energy; said signal processing apparatus is effective during said swing to determine a pretrigger time at which said firing command should be to applied to said assistive energy source; said signal processing apparatus is further effective at said determined pretrigger time to generate said firing command; said assistive energy source is responsive to the generation of said firing command to apply assistive energy to said velocity generating apparatus; and said velocity generating apparatus is responsive to the receipt of said assistive energy to impart said incremental velocity to said golf ball upon impact; said pretrigger time is a function of club head performance information; said club head performance information includes golf ball velocity as a function of a delta-t time, where said delta-t time is the time interval in advance of said time of impact to generate said firing command.

Preferably said apparatus further comprising an assistive energy source for applying said assistive energy; said sensor apparatus is effective during said swing to determine said present distance between said club face and said golf ball; said signal processing apparatus is effective during said swing to determine a prescribed distance between said golf ball and said club face at which said firing command should be applied to said assistive energy source; said signal processing apparatus is further effective when said present distance equals said prescribed distance to generate said firing command; velocity generating apparatus; said assistive energy source is responsive to the generation of said firing command to apply assistive energy to said velocity generating apparatus; and said velocity generating apparatus is responsive to the receipt of said assistive energy to impart incremental velocity to said golf ball upon impact.

Preferably said apparatus said sensor apparatus is chosen from the following group;

an ultrasonic sensor, a laser sensor, a radar sensor, an accelerometer sensor, a magnetic sensor, an electromagnetic sensor, a contacting sensor, a light emitting diode sensor, and a metal detector sensor;

said sensor apparatus is further effective during said swing to determine the approach velocity of said golf club face toward said golf ball; and said signal processing apparatus is further responsive to a determination of said impact time and said determination of said approach velocity to determine when to generate said firing command or, alternatively, said signal processing apparatus is further responsive to said present distance to determine when to generate said firing command.

Preferably said sensor apparatus is effective to determine the approach velocity of said golf club face toward said golf ball; said signal processing apparatus is effective to determine a predicted time of impact of said golf club face with said golf ball; said signal processing apparatus is further effective to determine a delta-t time; and said signal processing apparatus is further effective to generate said firing command at said delta-t time interval prior to said ball impact.

Preferably said apparatus enables said user to control said incremental velocity or distance of said golf ball resulting from said impact.

Preferably said assistive energy is stored in said golf club; said firing command is effective only on the downswing portion of said swing; said firing command is effective only if limiting values of prescribed swing conditions are met; said prescribed swing conditions are chosen singly or in combination from a list including:
  swing distance,
  swing velocity,
  swing acceleration,
  initial club head starting position relative to said golf ball,
  elapsed time during said golf swing,
  club orientation relative to gravity, and
  club head random motion;
said signal processing apparatus distinguishes between motion of said golf club head representing a backswing and random motion of said golf club head; and said signal processing apparatus is further affective to inhibit the generation of said firing command upon a determination of random motion of said golf club head.

Preferably said sensor apparatus comprises an accelerometer that determines the acceleration of said club head; the velocity of said club head is determined by integrating said acceleration; and the distance traveled by said club head is determined by integrating said velocity.

Another aspect comprises a method of operating apparatus adapted to control the operation of an assistive energy golf club head during a swing by a user of a golf club coupled to said golf club head; said method including the steps of:
  operating sensor apparatus to sense the travel of said golf club head relative to a golf ball: operating signal processing apparatus to generate a firing command under control of an approach parameter during said swing and prior to the impact of the club face of said golf club head with said golf ball; applying assistive energy from said golf club face to said golf ball responsive to said generation of said firing command said assistive energy is effective to apply incremental velocity to said golf ball.

Preferably said approach parameter is based on a predicted impact time of said golf club face with said golf ball or, alternatively, is based on the present distance between said golf club face and said golf ball.

Preferably said method further comprising the steps of: operating said signal processing apparatus during said swing to determine a pretrigger time at which said firing command should be applied to an assistive energy source prior to the impact of said golf club face with said golf ball; applying said firing command to said assistive energy source at said pretrigger time; applying said assistive energy to a velocity generating apparatus; and imparting incremental velocity to said golf ball upon impact with said club face responsive to the said generation of said firing command.

Preferably said method further comprising the steps of operating sensor apparatus during said swing to determine said present distance between said club face and said golf ball; operating signal processing apparatus during said swing to determine a prescribed distance at which said firing command should be applied to said assistive energy source prior to the impact of said golf club face with said golf ball; applying said firing command to said assistive energy source when said golf club face is at said prescribed distance; applying said assistive energy to a velocity generating apparatus; responsive to said application of said firing command; and imparting incremental velocity to said golf ball responsive to said application of said assistive energy.

Preferably said sensor apparatus is chosen singly or in combination from the following group;
  an ultrasonic sensor, a laser sensor, a radar sensor, an accelerometer sensor, a magnetic sensor, an electromagnetic sensor, a contacting sensor, a light emitting diode sensor, and a metal detector sensor.

Preferably said method alternatively including the steps of operating said ultrasonic sensor to transmit an ultrasonic signal to said golf ball; receive a return ultrasonic signal reflected from said golf ball; and processing said reflected ultrasonic signal to control the generation of said firing command; alternatively.

Preferably said method including the steps of operating said laser sensor to transmit a laser signal to said golf ball; receive a return laser signal reflected from said golf ball; and processing said reflected laser signal to control the generation of said firing command.

Preferably said method including the steps of operating said radar sensor to transmit a radar signal to said golf ball; receive a return radar signal reflected from said golf ball; and processing said reflected radar signal to control the generation of said firing command.

Preferably said accelerometer sensor comprises at least one accelerometer, said method including the steps of determining the position of said golf ball when at rest prior to the initiation of said swing; operating said accelerometer sensor during said swing to generate acceleration information;
  determining velocity for said swing by integrating said acceleration information; and determining the present distance between said golf ball and said golf club face by integrating said velocity information.

Preferably said accelerometer sensor comprises multiple accelerometers, said method including the steps of: operating said multiple accelerometers to generate multiple axes of acceleration information; and
  using said multiple axes of acceleration information to increase the accuracy of when said signal processing apparatus generates said firing command.

Preferably said method including the steps of operating said magnetic sensor to detect the characteristics of a magnetic field generated by a magnet in said golf ball or in a golf tee supporting said golf ball; and process said detected magnetic field characteristics to control the generation of said firing command.

Preferably said method including the steps of operating said electromagnetic sensor to detect the characteristics of an electromagnetic field generated by an electromagnetic field generator positioned proximate said golf ball; and process said detected electromagnetic field characteristics to control the generation of said firing command Preferably said method including the steps of operating said metal detector sensor to detect metal contained within said golf ball or said golf tee supporting said golf ball; and controlling the generation of said firing command in response to the detection of said metal.

Preferably said method including the steps of operating said contact sensor to detect the contact of said ball with said contact sensor prior to the impact of said golf ball with said club face; and controlling the generation of said firing command in response to said detection of said golf ball.

Preferably said method further comprising the further steps of determining the approach velocity of said golf club face with respect to said golf ball during said swing; and generating said firing command responsive to a determination of said impact time and said determination of said velocity.

Preferably said method further comprising the steps of operating apparatus responsive to said determination of said distance to generate said firing command.

Preferably said method further comprising the steps of determining the approach velocity of said golf club face toward said golf ball; determining a predicted time of impact of said golf club face with said golf ball; determining a delta-t time to generate said firing command prior to said time of impact; and determining a pretrigger time to generate said firing command based on said delta-t time prior to said time of impact.

Preferably said method further comprising the steps of determining a pretrigger time to generate said firing command functionally related to the club head performance information; said club head performance information includes golf ball velocity as a function of a delta-t time, where said delta-t time is the time interval in advance of said time of impact to generate said firing command.

Preferably said method comprising the further step of enabling said user to control the velocity or distance of said golf ball resulting from said impact.

Preferably said method including the steps of generating said firing command only if limiting values of prescribed swing conditions are met during said swing; choosing said prescribed swing conditions singly or in combination from a list including;
　swing distance,
　swing velocity,
　swing acceleration,
　initial club head starting position relative to said golf ball
　elapsed time during said golf swing,
　club orientation relative to gravity, and
　club head random motion.

Preferably said method including the step of operating said signal processing apparatus during the backswing portion of said swing to distinguish between motion of said golf club head representing a backswing and random motion of said golf club head; and inhibiting the generation of said firing command upon a determination of random motion of said golf club head.

Preferably said sensor apparatus comprises an accelerometer sensor, said golf club is equipped with and alerting apparatus adapted to provide an audio, visual or vibratory signal to said user when it is time to initiated said swing, said method comprises the further steps of positioning said club head proximate said golf ball in a rest position; maintaining said club head motionless and proximate said golf ball; operating said alerting apparatus when said club head has remained motionless for a time duration adequate to enable said signal processing apparatus to determine the at rest position of said golf ball; and operating said alerting apparatus to generate an alert signal to advise said user that the swing of said golf club may begin.

DESCRIPTION OF THE DRAWINGS

FIG. 1 shows some of the basic elements including an assistive energy type golf club head shown in cross section with a golf ball proximity sensor, and a handle partly cut away to show the information processing circuit within.

DETAILED DESCRIPTION OF THE INVENTION

FIGS. 1-13 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
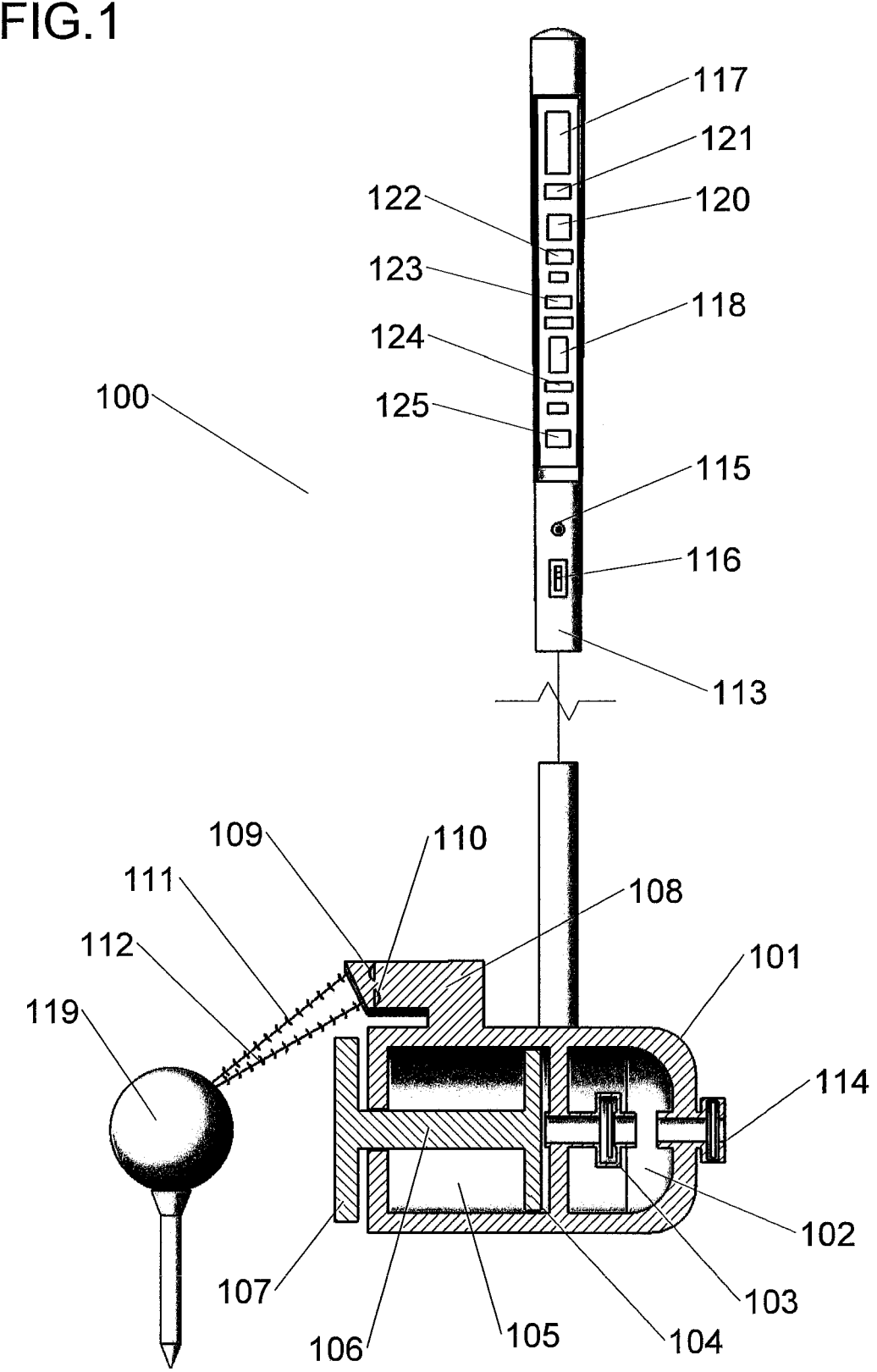
FIG. 1 is a view of apparatus embodying the present invention.
Figure 1A:
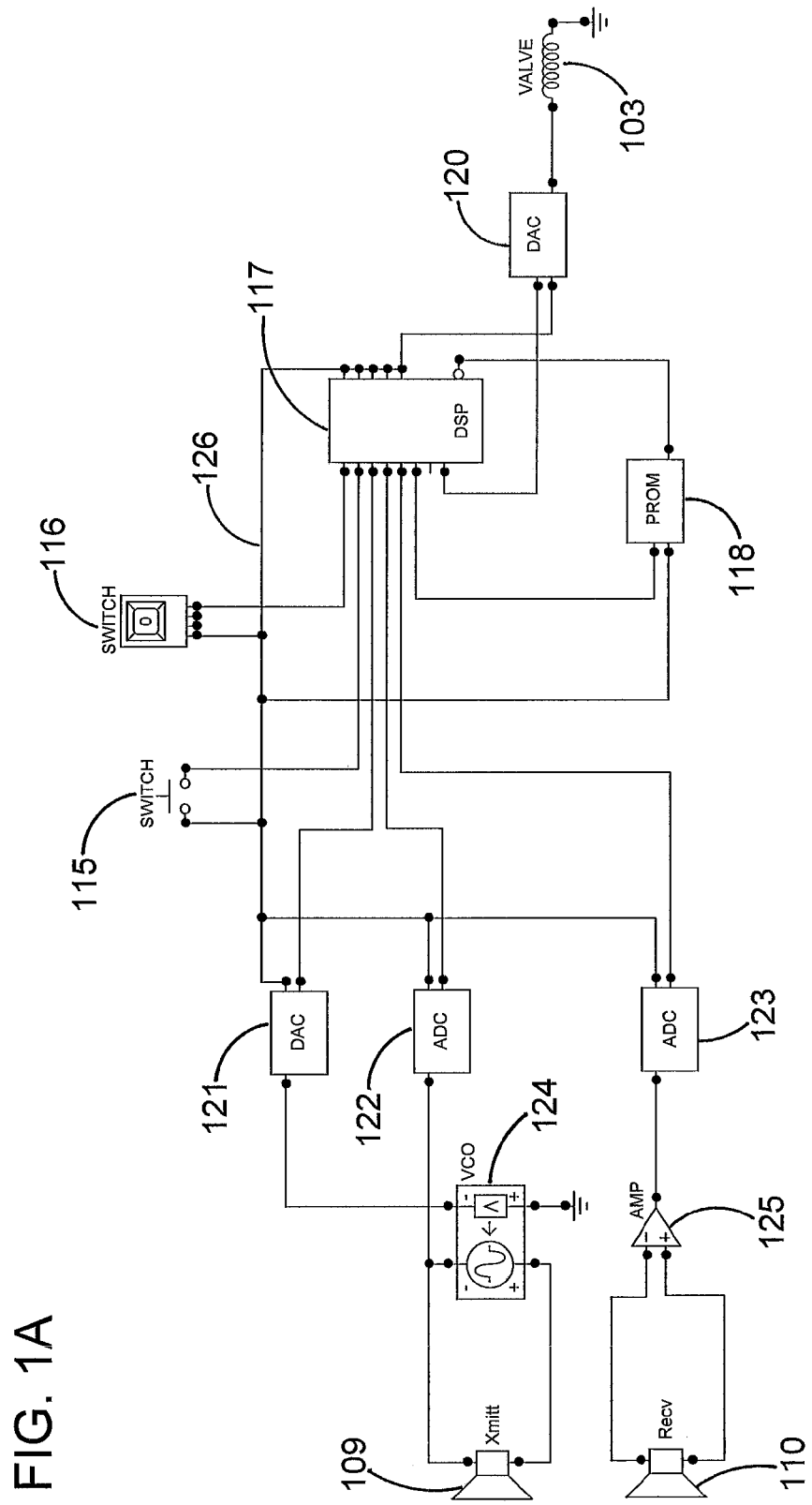
FIG. 1A is a circuit diagram for the exemplary embodiment of FIG. 1.

Description of FIGS. 1 and 1A

The physical design of one exemplary embodiment of the present invention is described with reference to the drawings. FIG. 1 describes a golf club 100 shown in cross section view.

FIG. 1A is the associated circuit diagram for use with the apparatus of FIG. 1. Golf club 100 is comprised of a compressed gas assistive energy type golf club head 101 and handle 113 which is hollow and contains circuit control components. Club head 101 has a filling port 114 effective to convey compressed gas to a storage reservoir 102. Further shown is a solenoid valve 103 for releasing compressed gas from reservoir 102 onto piston 104 within cylinder 105. The compressed gas is effective to create a force on piston 104 sufficient to accelerate it along with its associated piston rod 106 and club face 107 which are both fixedly attached thereto. Attached to club head 101 is proximity sensor 108 which is an ultrasonic type sensor. Proximity sensor 108 includes ultrasonic transmitter 109 and receiver 110 which act together to transmit and receive ultrasonic signals 111 and 112 respectively. Ultrasonic transmitter 109 is controlled by voltage controlled oscillator (VCO) 124 which generates an oscillating signal of about 60 kilohertz. The 60 kilohertz signal is also connected to ADC 122 to convert it to a digital signal. VCO 124 is controlled by a voltage output from DAC 121 which receives its instructions digitally from DSP 117. Receiver 110 is responsive to ultrasonic signals that have reflected back from the surface of a golf ball. Any signals detected by receiver 110 are conditioned by operational amplifier 125 then converted to digital signals by ADC 123.

The circuit of FIG. 1A is controlled by DSP 117. Digital communication is conveyed over bus 126 to and from all digital components. Switch 115 is a momentary contact switch that starts the circuit process. Switch 116 is a binary coded decimal switch that allows for numeric input of desired golf ball velocity or distance. Programmable Read Only Memory (PROM) 118 is a memory storage device used to store inherent time delay performance information particular to the club design, program instructions, algorithms, user specified velocity or distance information, and other information. DAC 120 is a digital to analog converter that receives the firing command from DSP 117 and creates the requisite signal to initiate energy release by energizing solenoid valve 103.

Description of Normal Operation of the Embodiment of FIGS. 1 and 1A

During normal operation, the golfer using the apparatus embodying the invention begins by selecting the desired ball velocity using the ball velocity selector switch 116. This could also be a fixed setting and is not a necessary feature. However, since varying the pretrigger time controls the resulting ball velocity, this feature can be used to adjust for any type of golf shot from a drive shot at 225 feet per second or more, down to a chip shot at 20 feet per second or less. Assume 225 feet per second is the desired ball velocity. Switch 116 could also be used to input desired ball distance instead of desired ball velocity since these two parameters are related, however desired ball velocity is used for this example.

Next, the golfer addresses the ball as for a normal swing by lining up club face 107 just behind ball 119. Pressing switch 115 on handle 113 enables the circuit process to begin. DSP 117 causes DAC 121 to energize (VCO) 124 which causes ultrasonic transmitter 109 to start transmitting ultrasonic signals 111 toward ball 119. Any reflected ultrasonic signals 112 are sensed by receiver 110 and are conditioned by operational amplifier 125. The signals from operational amplifier 125 are then converted to digital signals in ADC 123 and made available on BUS 126. The signals from VCO 124 are also converted to digital signals in ADC 122 and made available on BUS 126. DSP 117 then compares the timing difference between the transmitted signal 111 to the received signal 112 for the determination of relative distance and velocity between ball 119 and club face 107. This distance is proportional to the timing difference between transmitted signal 111 and received signal 112. The club face 107 velocity is proportional to the time rate of change of this distance.

The distance and velocity information thus determined is used along with the desired ball velocity selection of 225 feet per second from switch 116. Information about inherent time delay performance pre-determined by testing and stored in PROM 118 is also available to DSP 117.

Description of FIGS. 2A, 2B, 2C, 2D, 2E, 2F, 3, and 4

Figure 2A:
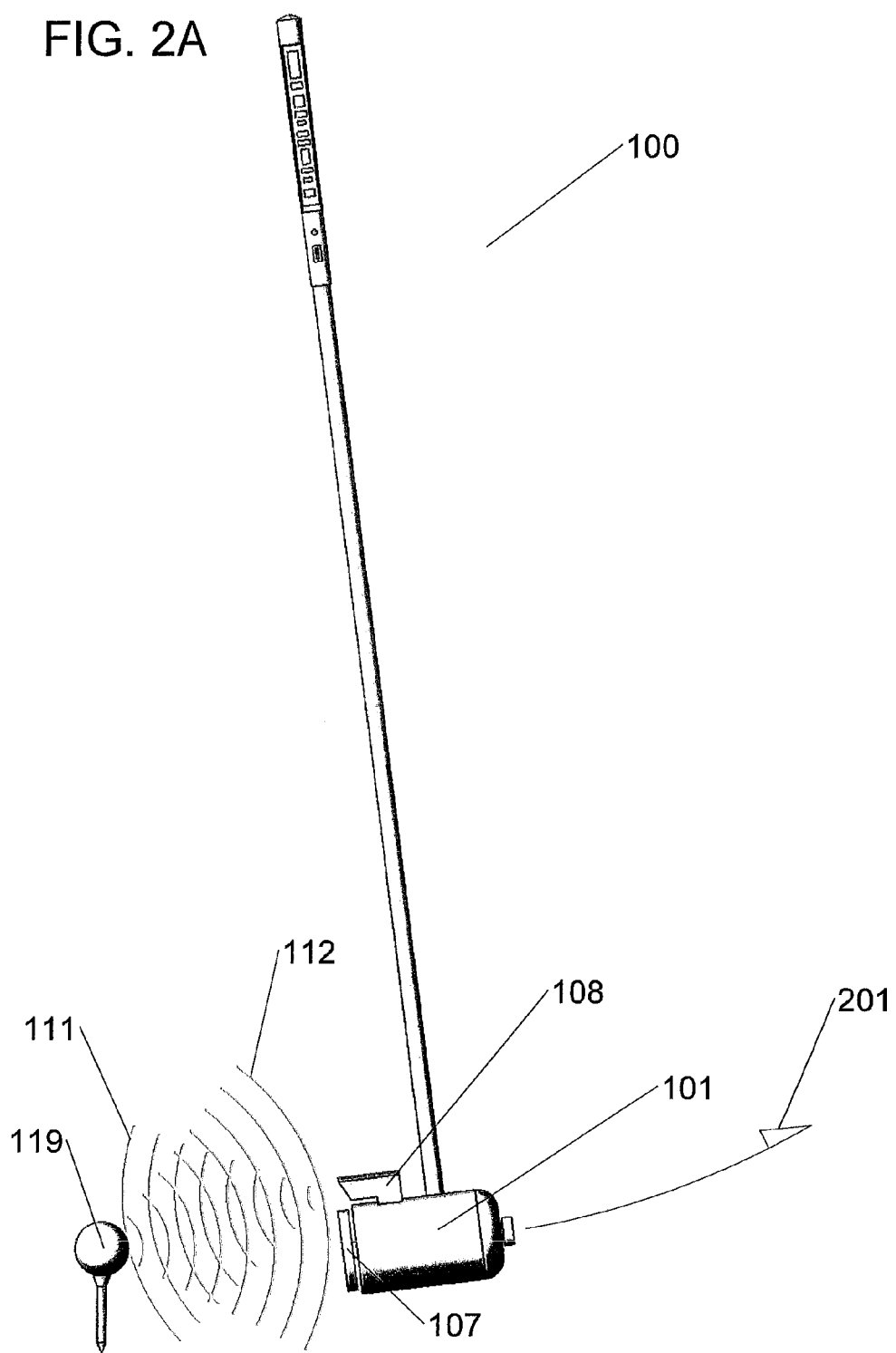
FIGS. 2A, 2B, and 2C show a sequence of golf club positions during the backswing portion of a golf swing.
Figure 2B:
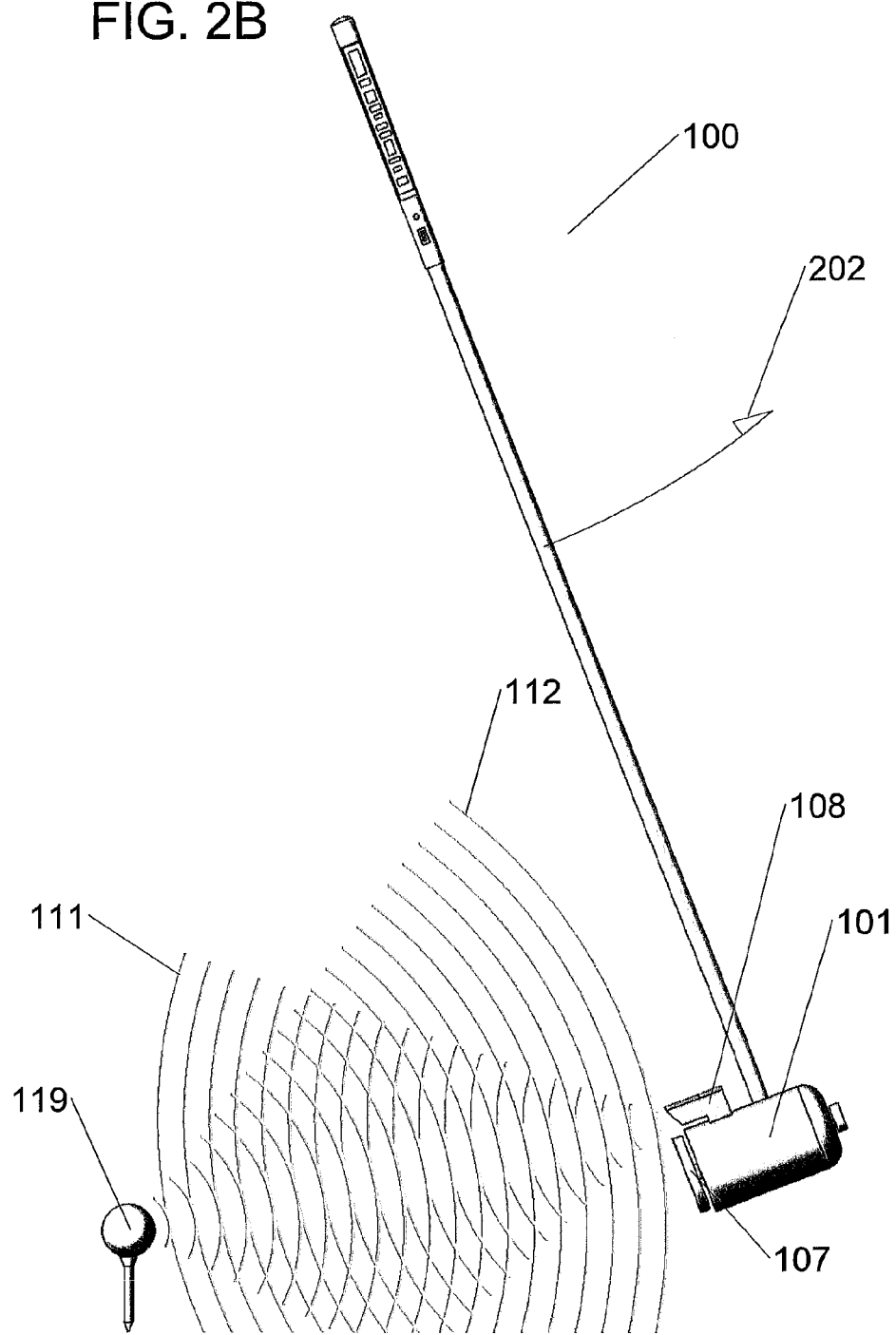
Figure 2C:
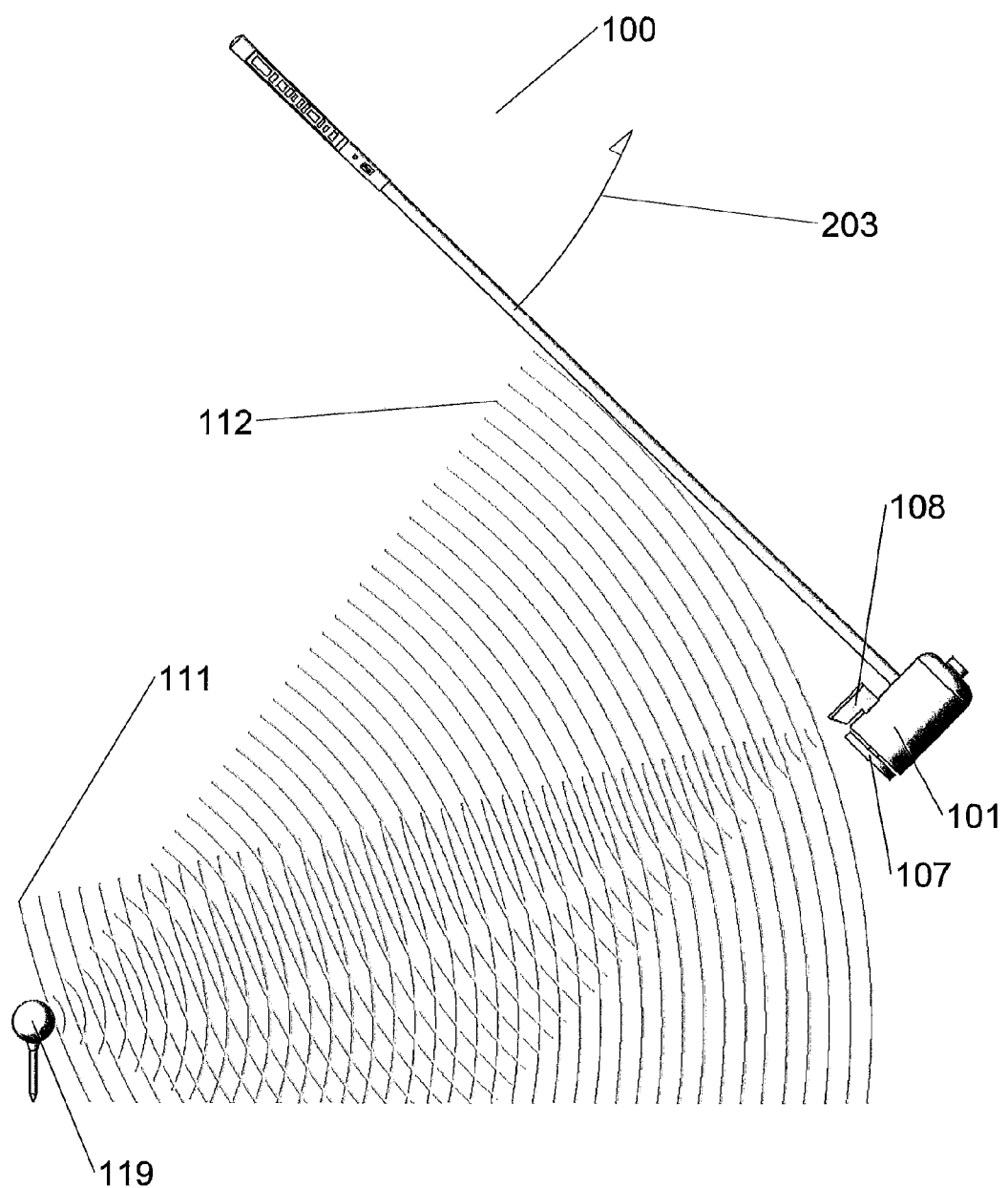
Figure 2D:
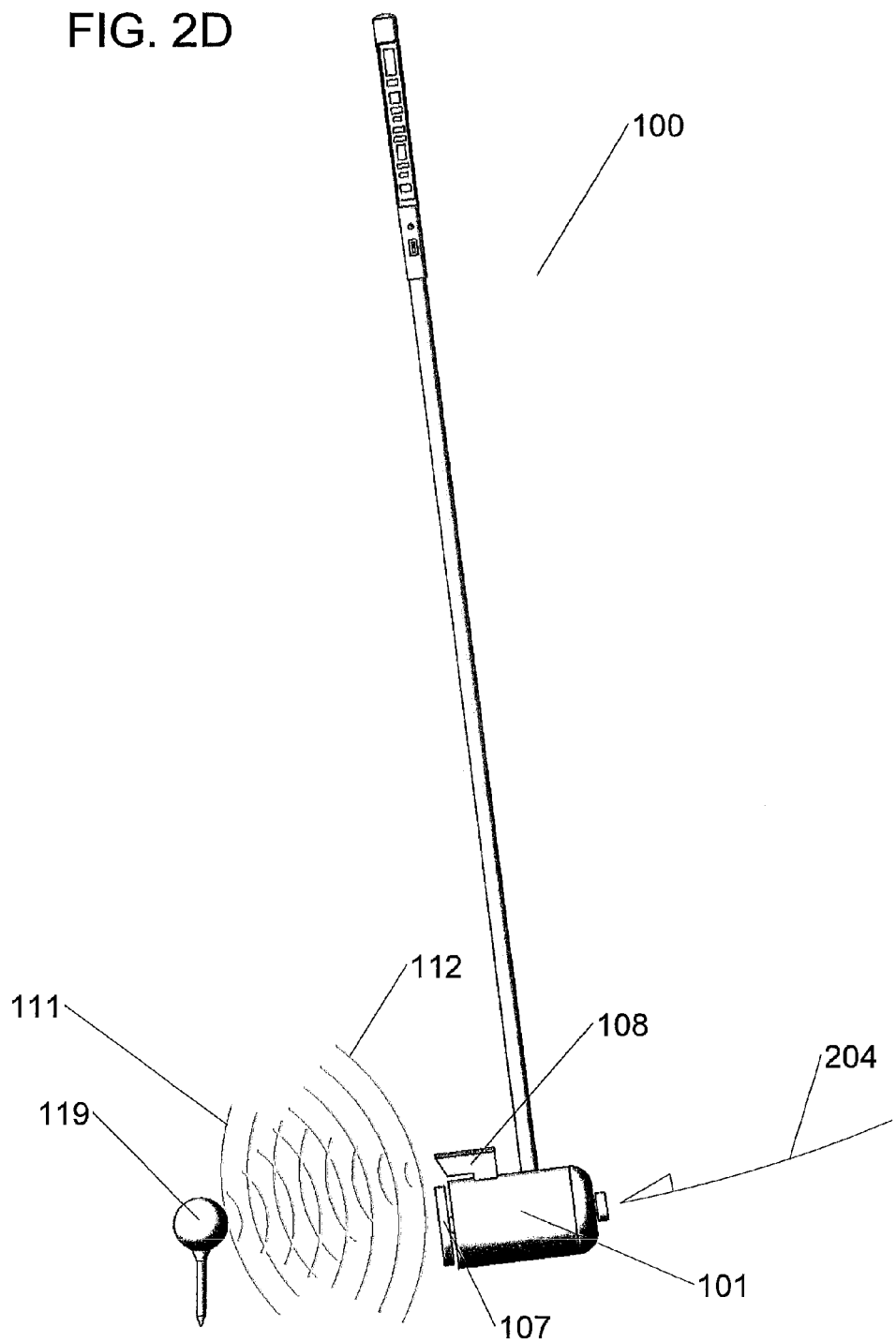
FIGS. 2D, 2E, and 2F show a sequence of golf club positions during the downswing portion of a golf swing.
Figure 2E:
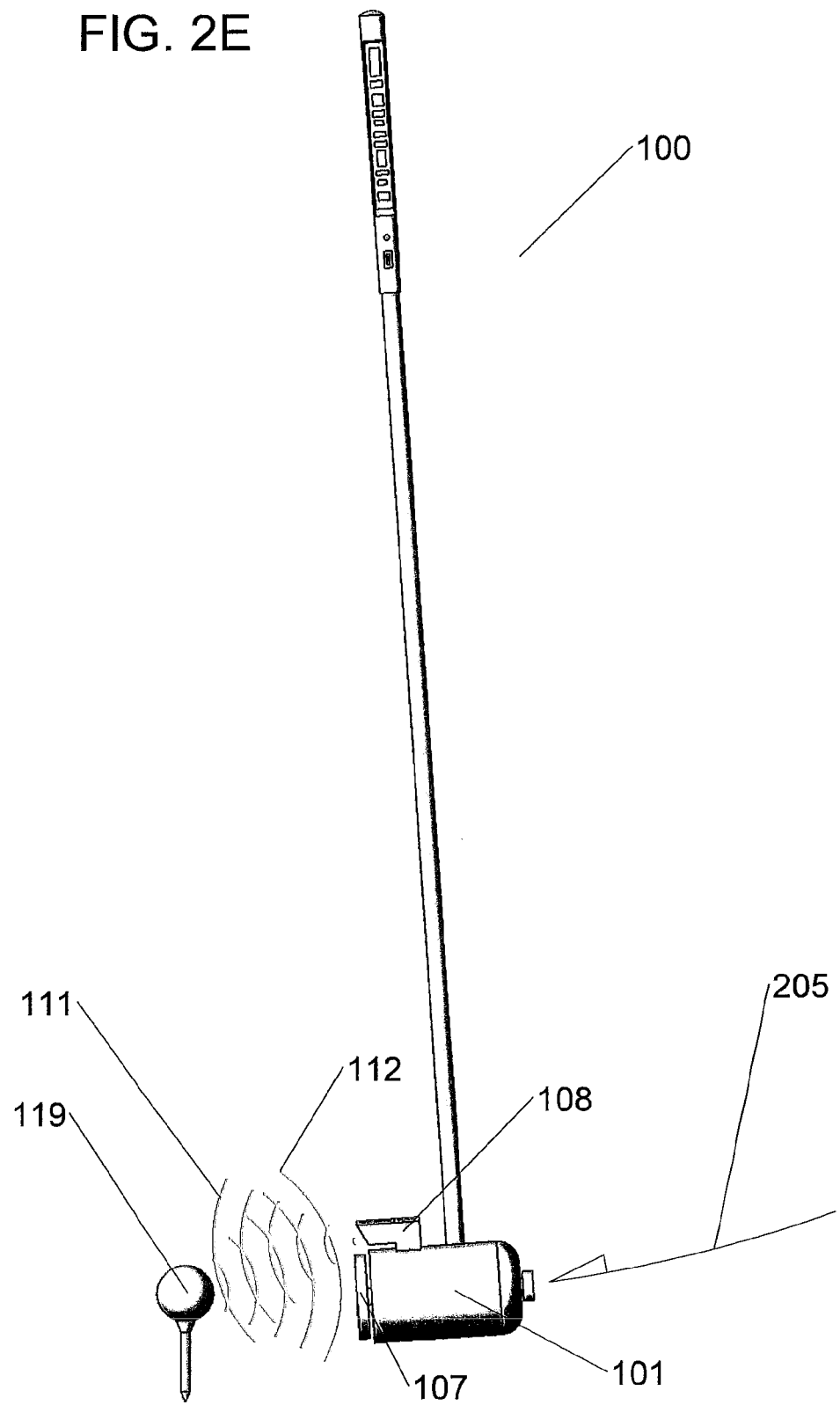
Figure 2F:
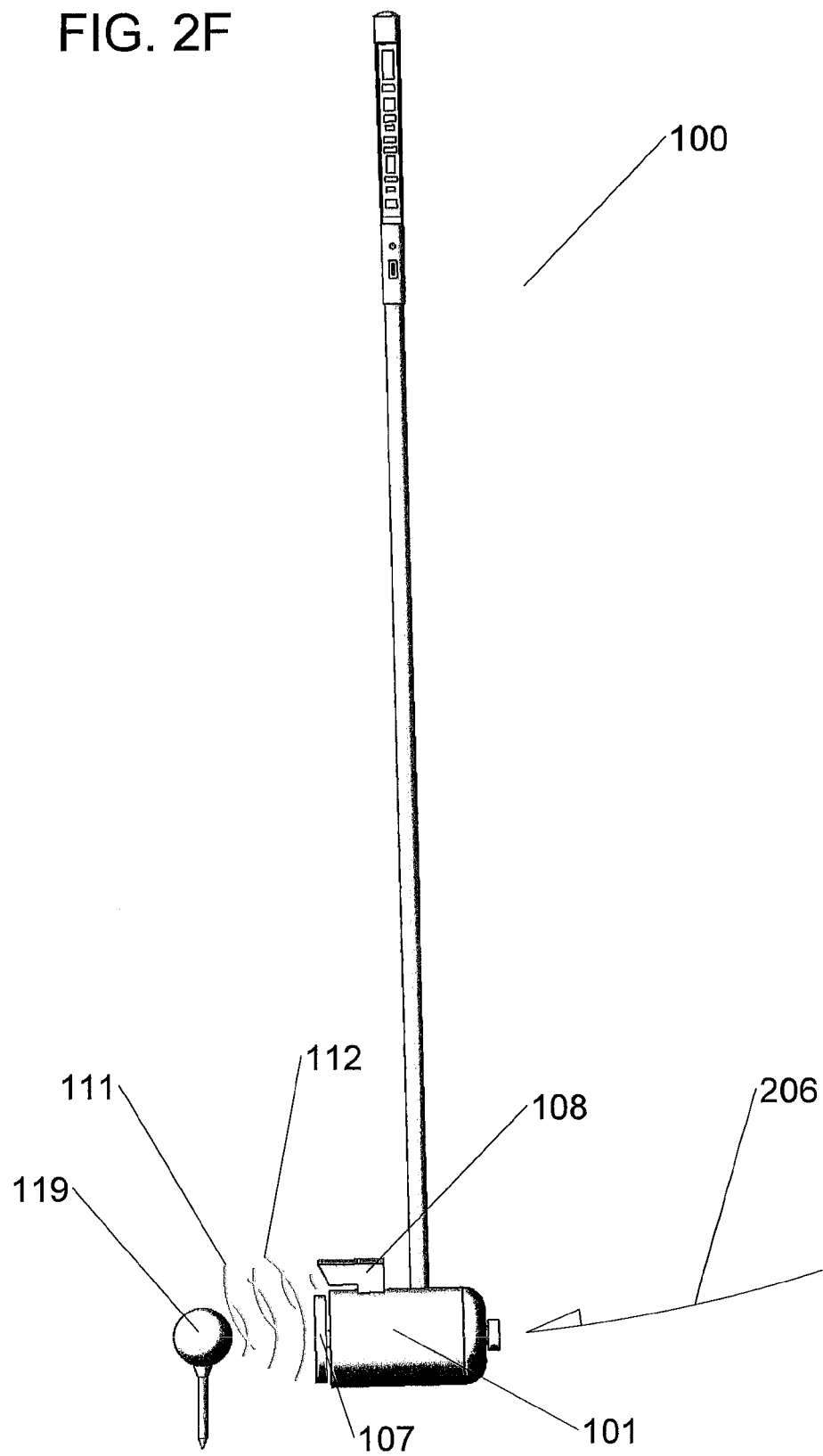
Figure 3:
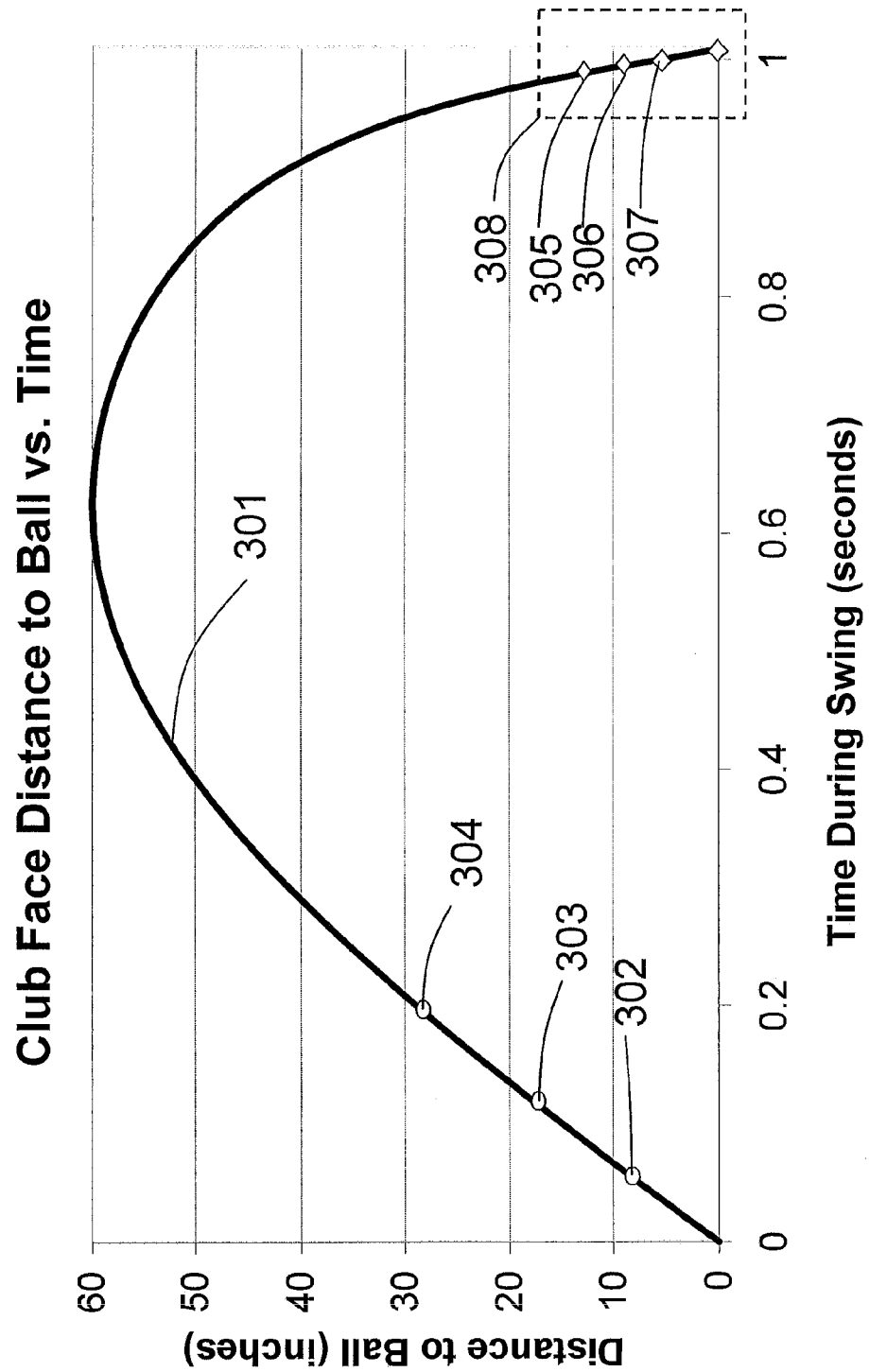
FIG. 3 is a graph showing the relationship between time during a golf swing, and golf ball distance from the club face, as might be sensed by an ultrasonic type sensor.
Figure 4:
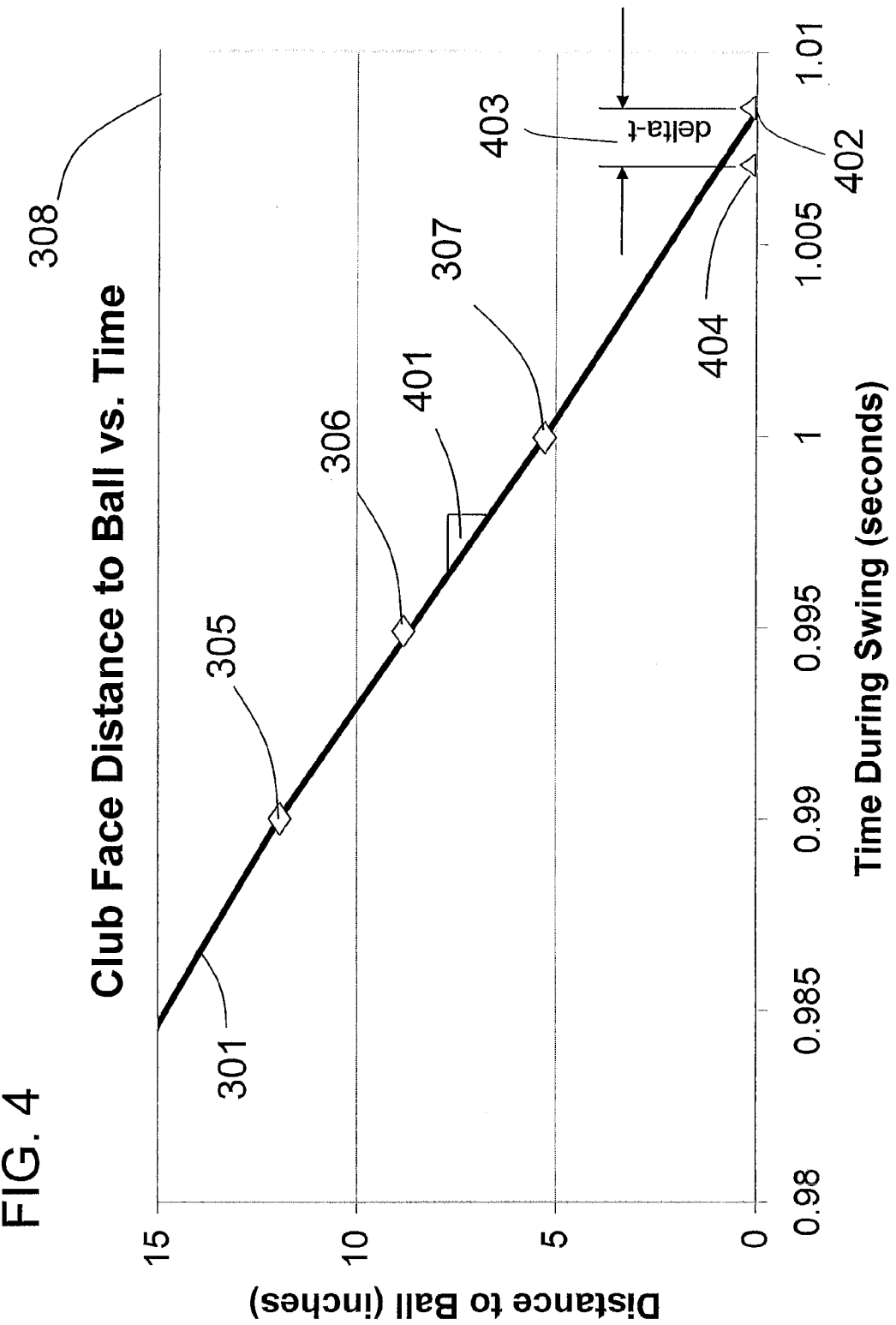
FIG. 4 is a close up view of the final few milliseconds of data from the right edge of the graph of FIG. 3.

FIGS. 2A, 2B, and 2C depict three sequential positions of golf club 100 during the backswing portion of a golf swing. FIGS. 2D, 2E, and 2F depict three sequential positions of golf club 100 during the downswing portion of a golf swing. FIG. 3 is a graph of curve 301 representing the distance between club face 107 of golf club head 101 and golf ball 119 as a function of time during a golf swing. FIG. 4 is an expanded portion 308 of the last few milliseconds of the curve 301 shown on FIG. 3.

As shown on FIG. 2A, as the golfer proceeds with a golf swing, club head 101 initially moves back along 201 away from ball 119. Sensor 108 directed by DSP 117 is transmitting ultrasonic signals 111 and receiving any reflected ultrasonic signals 112 to determine a corresponding distance and time as represented by point 302 on curve 301 of FIG. 3. As club head 101 moves further back along 202 on FIG. 2B, another distance and time as represented by point 303 on curve 301 of FIG. 3 is determined. As club head 101 moves further back along 203 on FIG. 2C another distance and time as represented by point 304 on curve 301 of FIG. 3 is determined.

As a practical matter, the backswing information points 302, 303, and 304 are not needed to calculate club face approach velocity and distance. The backswing or downswing information can be used for other purposes, for example safety purposes, to permit a firing command initiation only if prescribed swing conditions are met. Prescribed swing conditions could include limiting values of swing distance, swing velocity, swing acceleration, club head initial starting position relative to a golf ball, elapsed time during the swing, club orientation relative to gravity or some other swing condition or combination of conditions. The swing information could be used to distinguish between random club head motion and intentional swing motion, and permitting the firing command only if intentional swing motion is detected. Using swing information for safety purposes would minimize the chance of giving the firing command at an inappropriate time.

On the downswing as club head 101 moves forward along 204 on FIG. 2D, another distance and time as represented by point 305 on curve 301 of FIGS. 3 and 4 is determined. As club head 101 moves closer along 205 on FIG. 2E, another distance and time as represented by point 306 on curve 301 of FIGS. 3 and 4 is determined. As club head 101 moves closer along 206 on FIG. 2F, another distance and time as represented by point 307 on curve 301 of FIGS. 3 and 4 is determined.

The following Table 1 provides numerical values for illustrative purposes for the present example.

TABLE 1

| Data Point | Time (seconds) | Distance (inches) |
|---|---|---|
| 302 | .05 | 8 |
| 303 | .12 | 18 |

TABLE 1-continued

| Data Point | Time (seconds) | Distance (inches) |
|---|---|---|
| 304 | .2 | 28 |
| 305 | .990 | 12 |
| 306 | .995 | 8.5 |
| 307 | 1.00 | 5.5 |

With reference to FIG. 4, the mathematics for determining the approach velocity 401, which is the slope of curve 301, predicted time of impact 402, the trigger delta-t 403, and the pretrigger time 404 which is the time to initiate the firing command, can be done a number of ways depending on how much accuracy is desired. The simplest method uses two distance vs. time measurements, for example data points 306 and 307 of FIG. 4. Using these two points the approach velocity can be determined by the following Equation 1.

$$V_{401} = \frac{(X_{306} - X_{307})}{(t_{307} - t_{306})} = \text{Slope of curve 301} \quad \text{Eq. 1}$$

Where;
$V_{401}$=Approach Velocity 401 between points 306 and 307
$X_{306}$=Distance at point 306
$X_{307}$=Distance at point 307
$t_{306}$=Time at point 306
$t_{307}$=Time at point 307

Approach Velocity 401=[8.5 in−5.5 in]/[1.0 s−0.995 s]=600 inches per second=50 feet per second The time at ball impact 402 is next determined by linear extrapolation as follows using Equation 2.

$$t_{402} = t_{307} + \frac{X_{307}}{V_{401}} \quad \text{Eq. 2}$$

Where;
$t_{402}$=Predicted time at ball impact 402
$t_{307}$=Time at point 307
$X_{307}$=Distance to ball at point 307
$V_{401}$=Approach Velocity 401 between points 306 and 307

Time at ball impact 402=1.0 s+[5.5 in/600 in/s]
=1.00916 seconds

Figure 5:
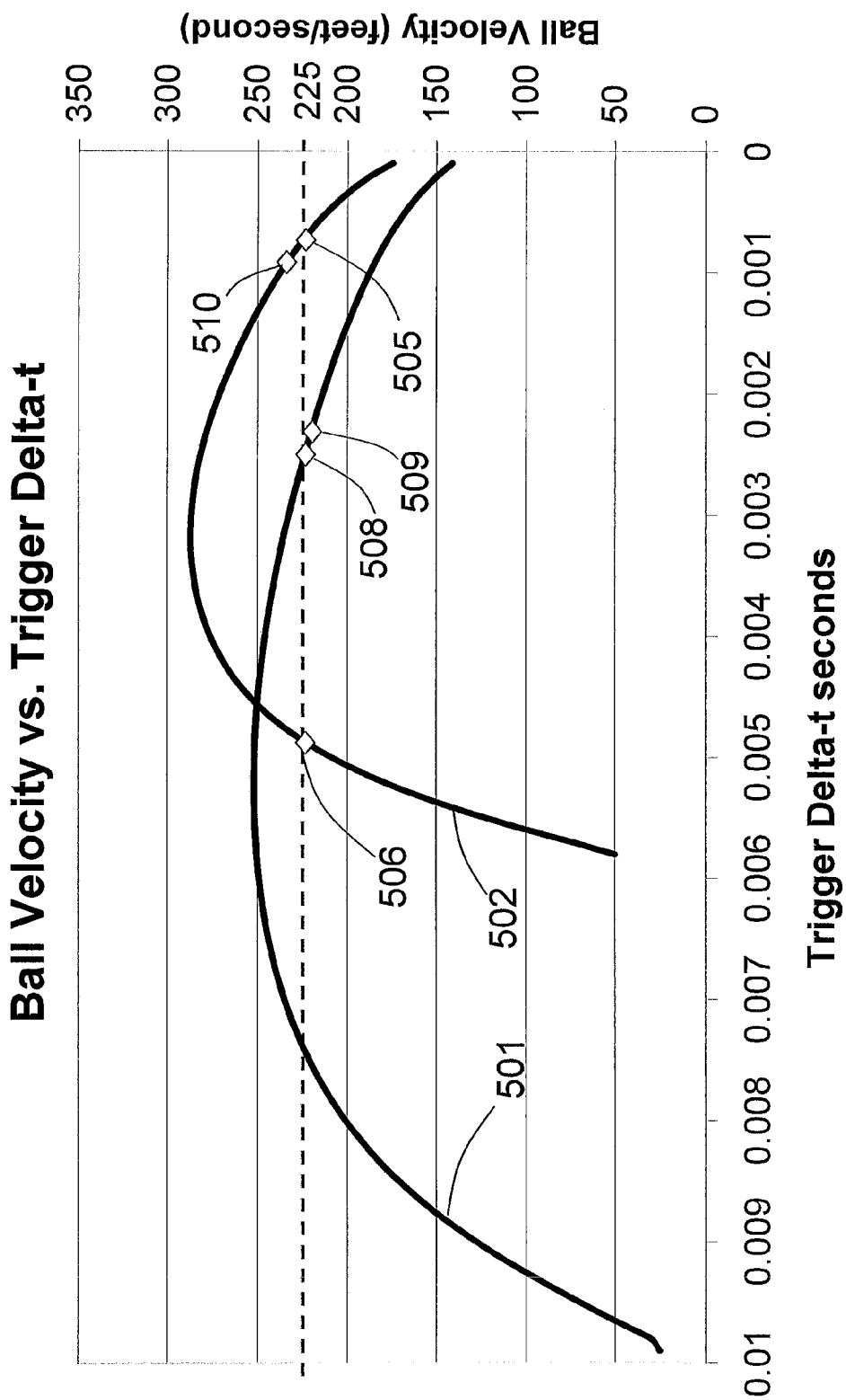
FIG. 5 is a graph showing the relationship between golf ball velocity and trigger delta-t. Two different club face approach velocity curves are depicted.

The trigger delta-t 403 and the pretrigger time 404 are next determined by referring to stored information in PROM 118 that characterizes the clubs performance of golf ball velocity vs. club face approach velocity and trigger delta-t. The trigger delta-t is the time difference between predicted ball impact and the time when the firing command is given.
Description of FIG. 5
FIG. 5 is a graphical representation of club characterization information that might be stored in PROM 118, usually in the form of look up tables. Curve 501 represents the resulting golf ball velocity as a function of trigger delta-t with a club face approach velocity of 16.6 feet per second. Similarly, curve 502 represents the resulting golf ball velocity as a function of trigger delta-t where the club face approach velocity is 50 feet per second.

It is instructive to observe that curves 501 and 502 of FIG. 5 both intersect the zero trigger delta-t y-axis at ball velocities that are not the peak values of each curve, but significantly lesser values. This shows the importance of the present invention since the higher desired velocities can only be achieved by initiating the firing command at a pretrigger time prior to impact by some delta-t.

In our present example the club face 107 approach velocity 401 was calculated to be 50 feet per second which is represented by curve 502 of FIG. 5. For the desired ball velocity of 225 feet per second, the trigger delta-t could be either 0.000713 seconds at point 505, or 0.00485 seconds at point 506, since curve 502 passes through the desired velocity of 225 feet per second at two different trigger delta-t points. The trigger delta-t 505 of 0.000713 seconds will be used for the example.

The pretrigger time is then calculated by the following equation 3.

$$t_{404} = t_{402} - t_{403} \quad \text{Eq. 3}$$

Where;
$t_{404}$=Pretrigger time 404
$t_{402}$=Predicted time at impact 402
$t_{403}$=Trigger delta-t 403

Pretrigger time 404=1.00916−0.000713=1.00845 seconds

Therefore, by initiating the firing command 0.000713 seconds in advance of ball impact, the resulting ball velocity will be the desired 225 feet per second. DSP 117 then initiates the firing command at time 404, 1.00845 seconds during the swing which causes DAC 120 to create a signal effective to open valve 103. This releases pressurized gas from reservoir 102 onto piston 104 creating a force effective to accelerate piston 104, connecting rod 106 and club face 107 toward ball 119. Club face 107 then impacts ball 119 causing it to be accelerated to the desired velocity of 225 feet per second.

It is instructive to observe from FIG. 5 that if the club face 107 approach velocity had been 16.6 feet per second as illustrated by curve 501, a far different trigger delta-t of 0.00248 seconds at point 508 would have been needed to achieve the same desired velocity. This illustrates the relationship between club face approach velocity and trigger delta-t to achieve the desired results.

The previous example only used two data points 306 and 307 of FIG. 4 to calculate the pretrigger time 404, and this would be the minimum required since it takes two points to define a line for linear extrapolation. Often however, a golfer's club head velocity is not constant prior to ball impact but may be accelerating either positively or negatively. This acceleration can affect the accuracy of the predicted time of impact. Therefore to achieve higher accuracies, more data points can be used along with more complicated mathematics to predict a more accurate time of impact 402. For example, as previously described, it takes two data points to define a linear relationship for linear extrapolation. Therefore it takes three data points to define a $2^{nd}$ order relationship which could then be used to accommodate any acceleration of the club head as it approaches the ball. For example, data points 305, 306 and 307 could all be used in a $2^{nd}$ order relationship to calculate approach velocity taking into effect any acceleration effects to calculate a more accurate time of impact 402 using a quadratic solution method or the like. In general this would fall into the mathematical realm of curve fitting and root finding which is well known and need not be elaborated here. A good reference on the subject can be found in the book Numerical Recipes in C, $2^{nd}$ addition, ISBN 0 521 43108 5. In particular, chapter nine discusses the area of Root Finding, and chapter 15 discusses Modeling of Data (curve fitting). Example programs written in C language are given that can be compiled into program instructions which would be stored in PROM 118 and used by DSP 117. In addition the commercially available mathematical program Matlab by Mathworks Inc. has several functions and programs available for fitting data and finding roots, which can then be compiled into program instructions which would be stored in PROM 118 and used by DSP 117. Another example is hereinafter given which illustrates the use of root finding for more accuracy.

Figure 6:
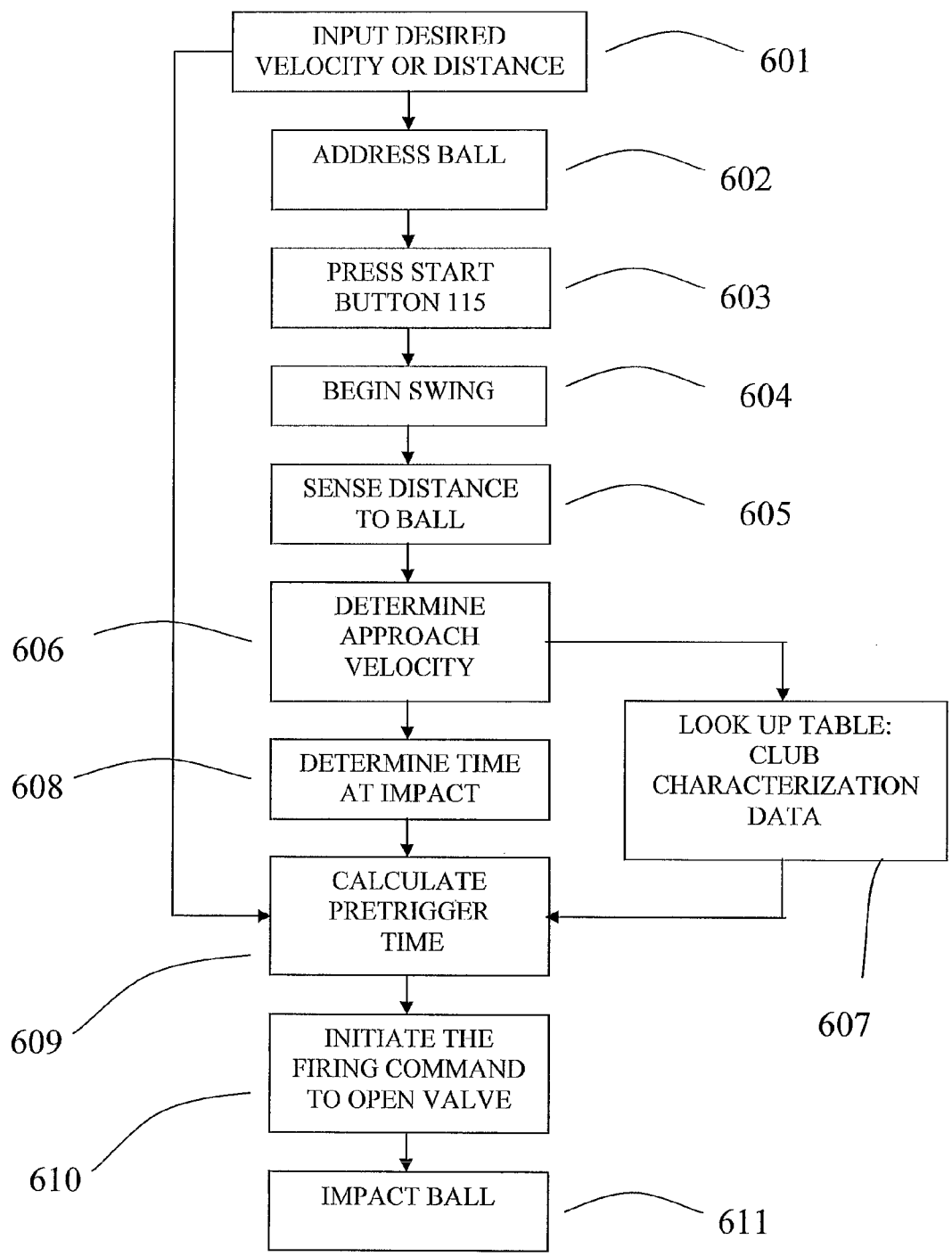
FIG. 6 is a flow chart showing the sequence of events while using the apparatus of the exemplary embodiment of FIG. 1.

Description of FIG. 6

FIG. 6 is a flow chart summarizing the sequence of events during the use of the embodiment of FIG. 1 as follows.

REF. DESCRIPTION

- 601 Input desired ball velocity or distance using switch 116.
- 602 Address ball by placing club face 107 just behind ball 119.
- 603 Press start button 115.
- 604 Begin swing.
- 605 Sense distance between club face 107 and ball 119.
- 606 Determine approach velocity of club face 107 toward ball 119.
- 607 Look up trigger delta-t vs. approach velocity data from PROM 118.
- 608 Determine predicted time at ball impact.
- 609 Determine pretrigger time.
- 610 Initiate firing command at the pretrigger time to open valve 103.
- 611 Impact ball 119 to achieve desired velocity.

Figure 6A:
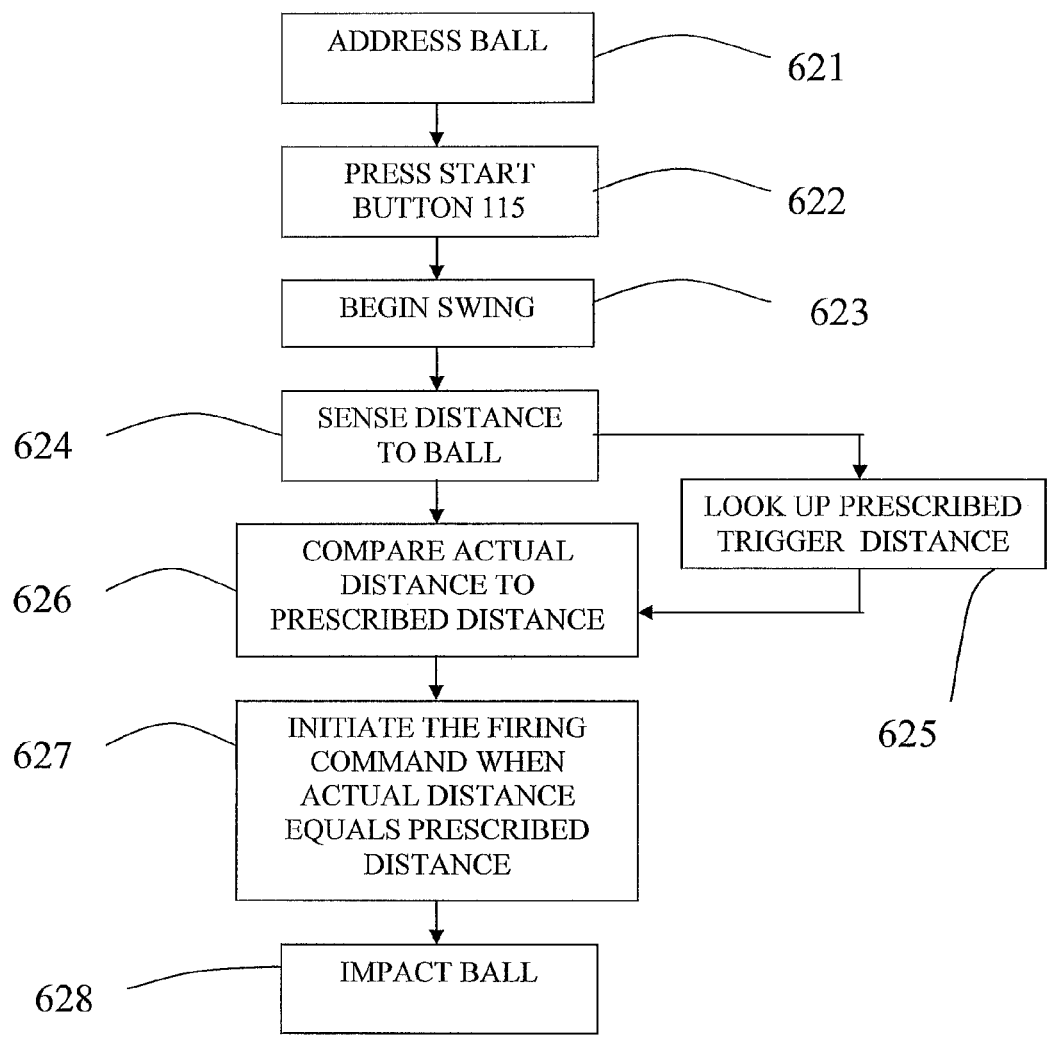
FIG. 6A is a flow chart showing the sequence of events while using the apparatus of the embodiment of FIG. 1 using a simplified alternative signal processing method.

Description of FIG. 6A

The example just described for the embodiment of FIG. 1 used a pretrigger time based on the predicted time to ball impact as the approach parameter, club head characterization information and other information, and included the ability to accurately specify the resulting ball velocity or distance either as a fixed value or as a user specified value. If an accurately specified ball velocity or distance is not required but an approximate velocity is acceptable, then the signal processing apparatus can be simplified by using distance to ball impact as the approach parameter to determine pretrigger time as follows. Instead of calculating the exact time to give the firing command, the firing command is given when the distance curve 301 equals a specified distance value during the downswing. For example 0.5 inches gives good results in many cases. The simplification results from not having to determine approach velocity, time at ball impact, trigger delta-t, and pretrigger time.

For this example, at a club face approach velocity of 50 feet per second or 600 inches per second, giving the firing command at a distance of 0.5 inches in advance of impact is the same as using a delta-t time of 0.00083 seconds since 0.5 inches divided by 600 inches per second equals 0.00083 seconds. This is indicated by point 510 on curve 502 of FIG. 5 and indicates the resulting ball velocity would be 229 feet per second which is very close to the desired velocity of 225 feet per second. Therefore the pretrigger time can be based on a distance to ball impact or a time to ball impact or some other approach parameter prior to impact.

FIG. 6A is a flow chart summarizing the sequence of events during the use of the embodiment of FIG. 1 with the just described alternate signal processing using distance to ball impact as the approach parameter to determine when to give the firing command.

REF. DESCRIPTION

- 621 Address Ball.
- 622 Press Start Button 115.
- 623 Begin Swing.
- 624 Sense distance between ball 119 and club face 107.
- 625 Look up prescribed pretrigger distance of 0.5 inches.
- 626 Compare actual distance to prescribed distance of 0.5 inches.
- 627 Initiate firing command when actual distance equals 0.5 inches.
- 628 Impact ball.

Description of FIGS. 7, 7A, 8A, 8B, 8C, and 8D

Figure 7:
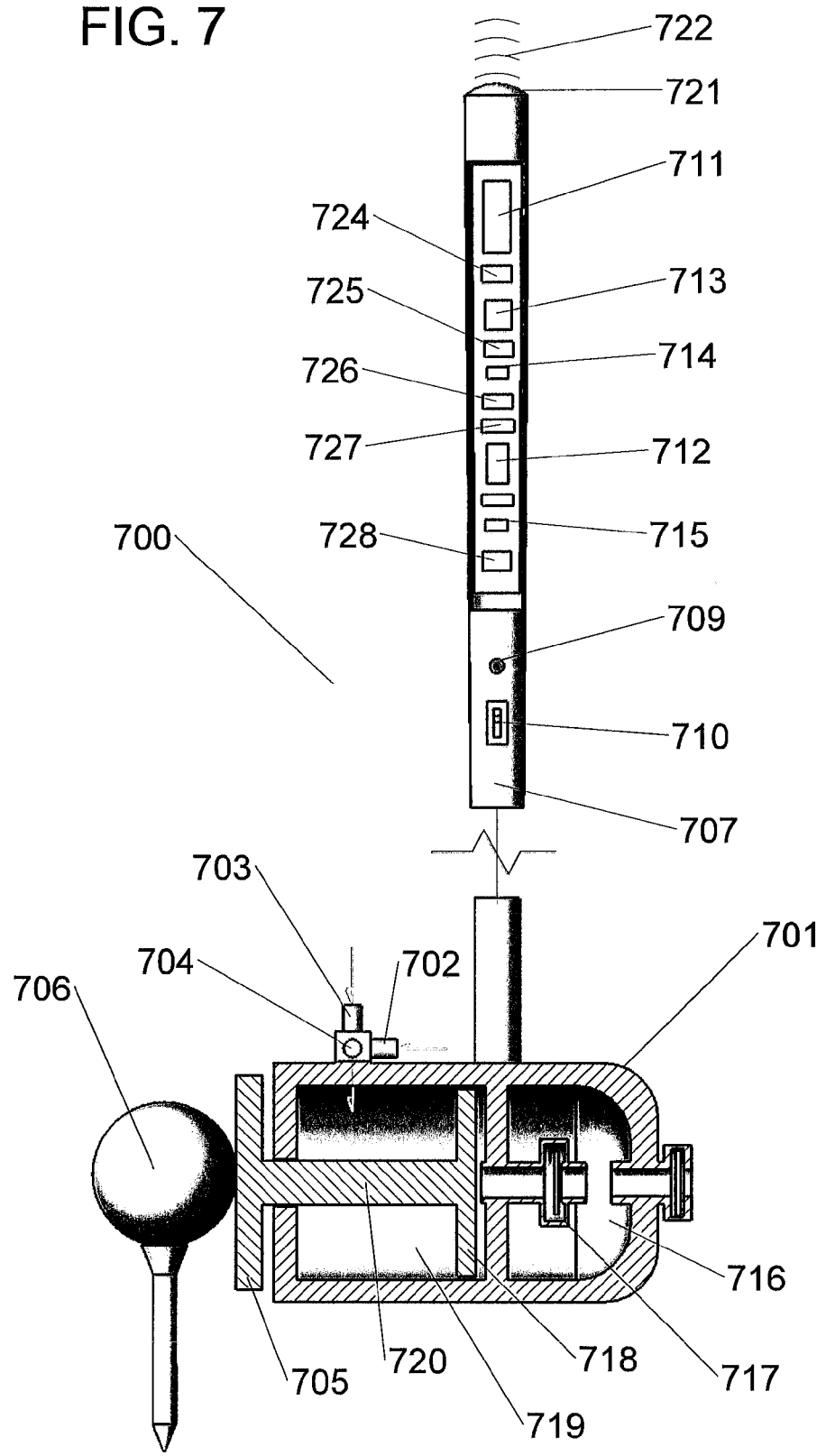
FIG. 7 is another possible exemplary embodiment of the present invention showing the use of accelerometer motion sensors.
Figure 7A:
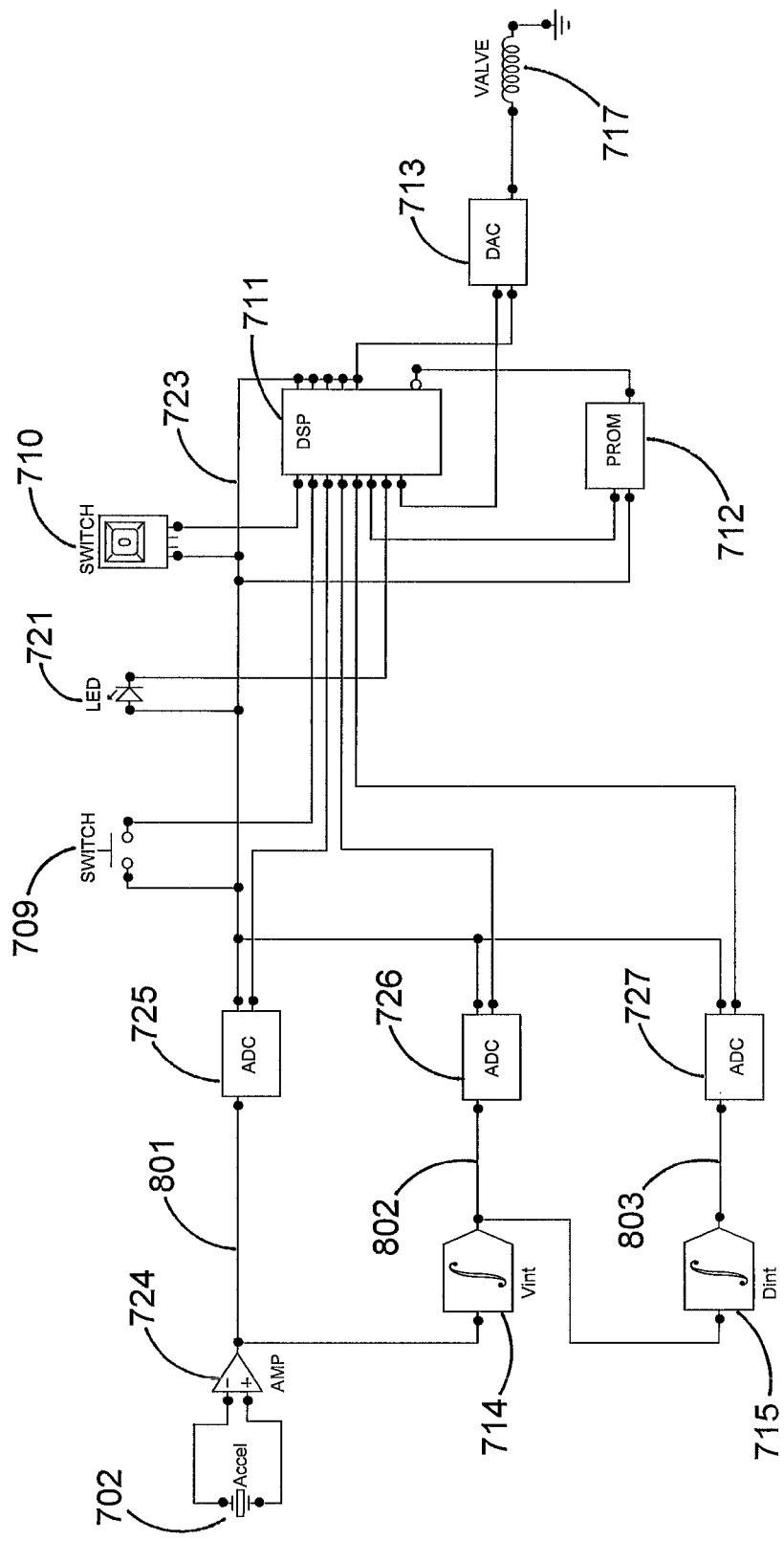
FIG. 7A is a circuit diagram for the embodiment of FIG. 7.
Figure 8A:
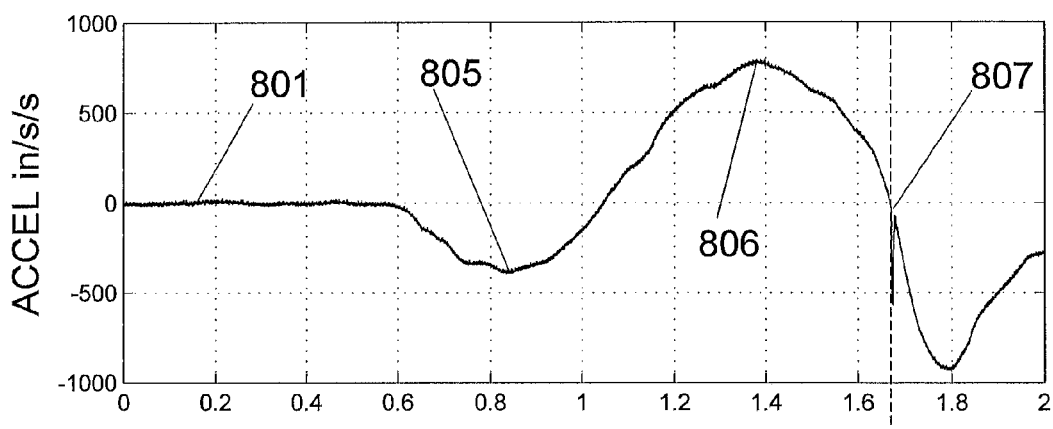
FIGS. 8A, 8B, and 8C are graphs of acceleration, velocity, and distances respectively of the club face of the embodiment of FIG. 7 during a golf swing, where accelerometer motion sensors are used.
Figure 8B:
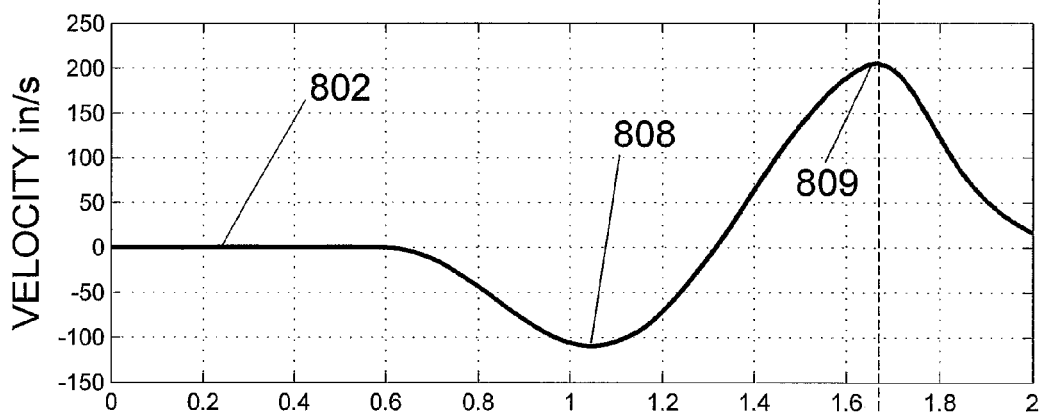
Figure 8C:
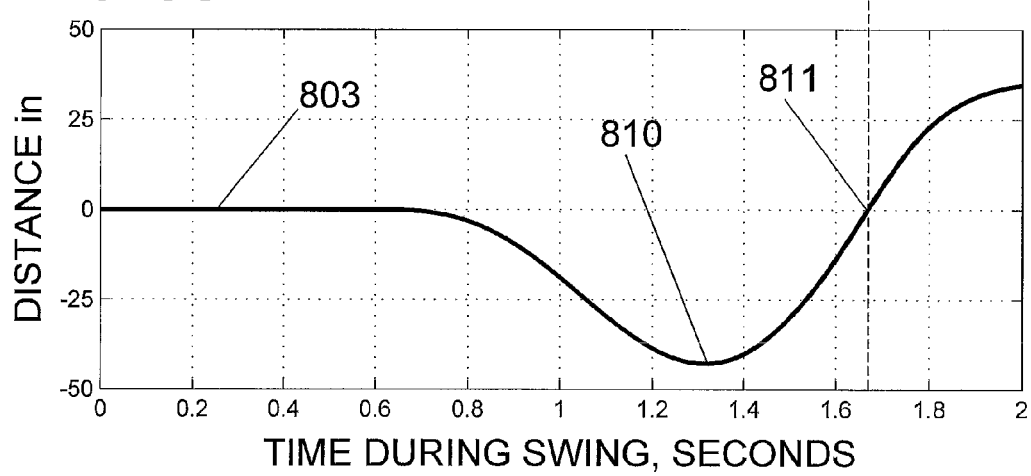
Figure 8D:
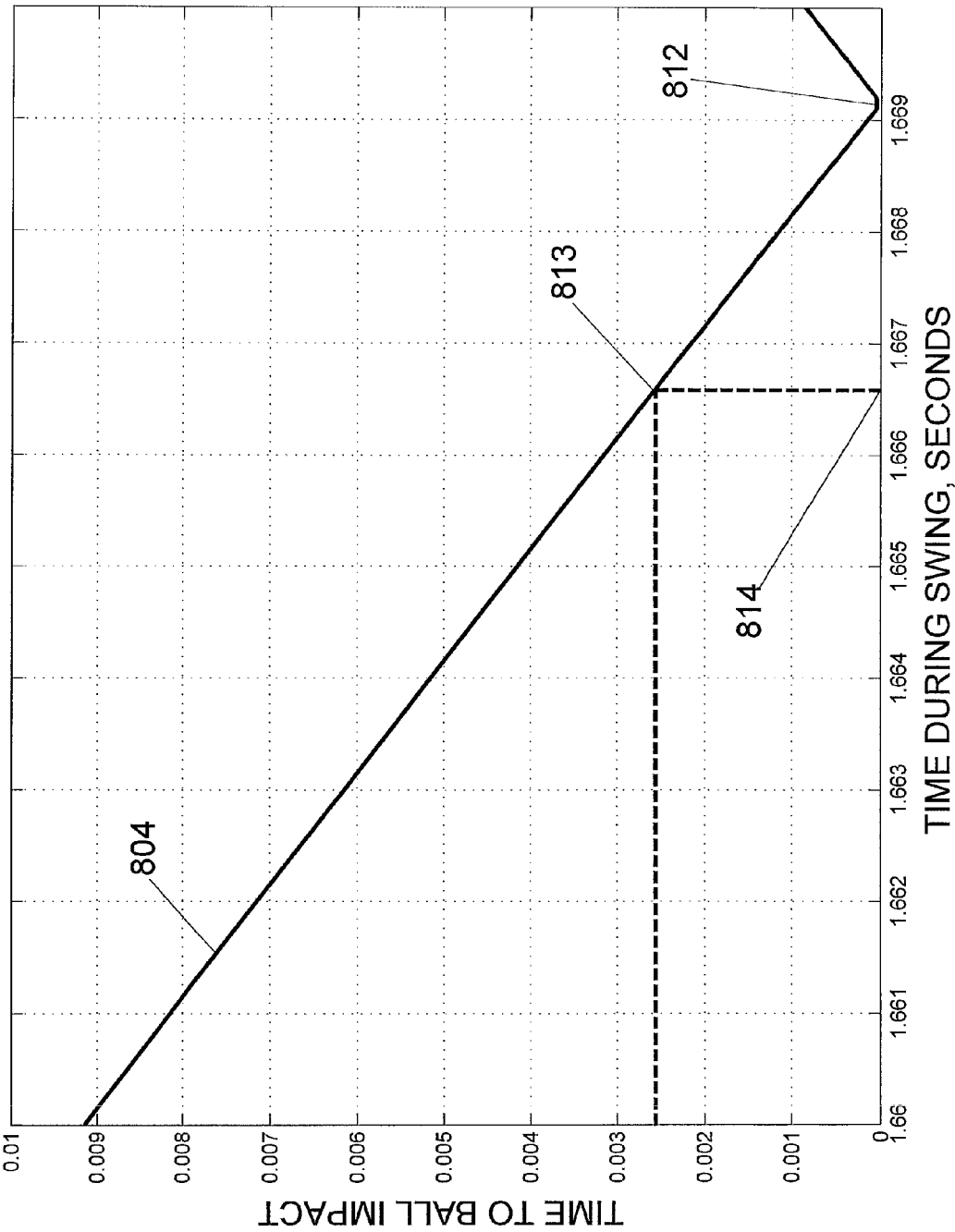
FIG. 8D is a graph of the last few milliseconds of predicted time to ball impact as determined from the acceleration, velocity, and distance graphs of FIGS. 8A, 8B, and 8C.
Figure 9:
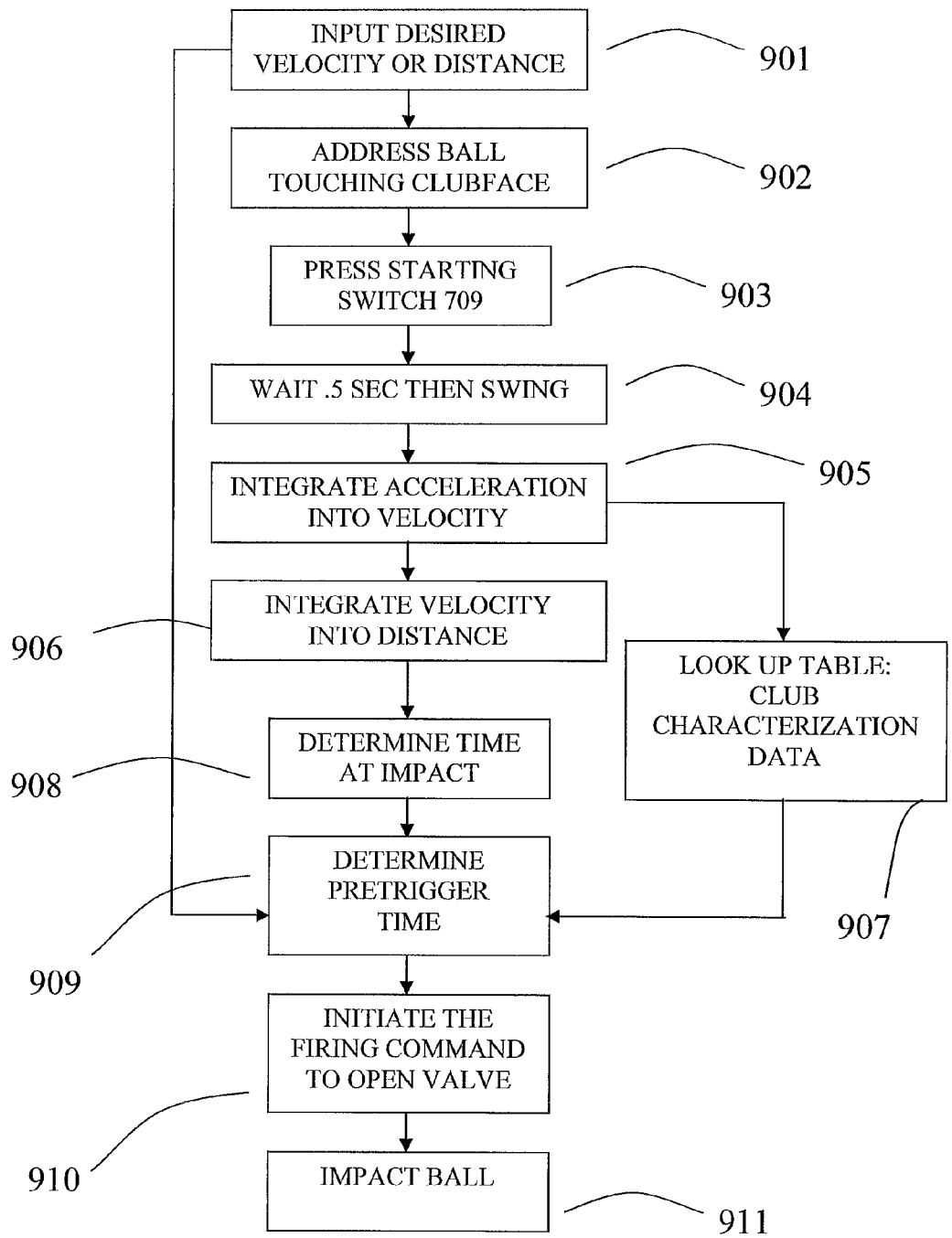
FIG. 9 is a flow chart showing the sequence of events while using the apparatus of the embodiment of FIG. 7.

FIG. 7 shows another possible exemplary embodiment of the invention comprising a golf club 700 having a club head 701 where the assistive energy is compressed gas as in the embodiment of FIG. 1, except that sensors 702, 703 and 704 are inertial type accelerometers instead of the ultrasonic type 108 of FIG. 1. FIG. 7A is the corresponding circuit diagram for use with the embodiment of FIG. 7. FIG. 8A shows club head 701 acceleration data curve 801 produced by accelerometer 702 as a function of time during a representative golf swing. FIG. 8B shows resulting club head 701 velocity curve 802 resulting from acceleration curve 801, and FIG. 8C shows resulting club head 701 distance curve 803 resulting from club head 701 velocity curve 802. FIG. 8D is a close up view of the final few milliseconds of predicted time to ball impact curve 804. FIG. 9 is a summary flow chart of the sequence of events that takes place using the embodiment of FIG. 7.

To use the embodiment of FIG. 7, a golfer would first select a desired ball velocity or distance using BCD switch 710. Next the golfer would address the ball by placing club face 705 directly behind, and preferably just touching ball 706. Next the golfer would press momentary contact switch 709 on handle 707 and hold club head 701 relatively motionless for a short waiting period of for example one half second. Accelerometer 702 together with amplifier 724 create acceleration signal 801 which is also converted to a digital signal by ADC 725 making this signal available to DSP 711 via bus 723. During this waiting period DSP 711 would average the acceleration data 801 coming from accelerometer 702 and store this average value as the zero acceleration value. This eliminates any bias errors and defines the initial starting position of club face 705 relative to ball 706. This is necessary because accelerometer 702 does not sense the proximity of ball 706 directly but, along with DSP 711, can only calculate its position from a defined starting point. Therefore, the initial starting position of ball 706 relative to club face 705 must here be defined. At the end of the waiting period, the golfer is alerted to proceed with the swing by feedback light 722 from light emitting diode (LED) 721 on the end of handle 707. Other types of feedback could here be used such as audible feedback from a sound device, vibrational feedback, or other. Next the golfer proceeds through the backswing acceleration 805 and the downswing acceleration 806, and finally impacts ball 706 at its original starting position shown by the impact acceleration glitch 807 on curve 801.

After the waiting period of 0.5 seconds, velocity integrator 714 is initially set to zero and begins integrating acceleration data 801 with respect to time. This is velocity data curve 802 which represents the velocity of club head 701 and club face 705. The backswing velocity 808 and downswing velocity 809 are shown on curve 802. ADC 726 converts velocity signal 802 to a digital signal and makes it available to DSP 711 via bus 723. As the velocity data curve 802 becomes available from velocity integrator 714, distance integrator 715 is initially set to zero and begins integrating velocity data 802 with respect to time to create distance data curve 803 which represents the distance that club face 705 has traveled from its initial starting position at time equals zero. ADC 727 converts distance signal 803 to a digital signal and makes it available to DSP 711 via bus 723. The maximum distance traveled during the golf swing 810 of curve 803 is shown. Also shown is the time where curve 803 crosses back through zero at 811 which is the time of ball impact as can be seen by its alignment with the actual impact glitch 807 on acceleration curve 801. Data curve 801 was created for explanatory purposes without giving a firing command so that impact glitch 807 could be clearly seen.

The next step in the method of the invention is to determine the time to ball impact curve 804 of FIG. 8D prior to actual impact so that a pretrigger time can be determined. As with the first described embodiment of FIG. 1, a linear extrapolation method could be used to predict the time of ball impact. However a more accurate method is next described that also uses acceleration data curve 801 thereby accounting for any changes in club face 705 velocity prior to ball impact.

To calculate the remaining time to ball impact curve 804, the acceleration curve 801, the velocity curve 802 and the distance curve 803 are all used in a $2^{nd}$ order quadratic solution by finding the roots of the following equation 4 as follows. This solution is done digitally within DSP 711 using the digital signals from ADC 725, 726, and 727.

$$X = X_0 + Vt + \frac{At^2}{2} \qquad \text{Eq. 4}$$

Where:
X=distance between club face 705 and ball 706 as function of time
$X_0$=present distance value from curve 803
V=present velocity value from curve 802
A=present acceleration value from curve 801
t=time Using program instructions from PROM 712, DSP 711 sets the distance X in equation 4 equal to zero, which is the distance at ball impact. Next, DSP 711 solves for the time t on a point by point basis using time concurrent data points from curves 801, 802 and 803 as they become available from ADC 725, 726, and 727 respectively. Equation 4 is solved using the quadratic formula method. Each solution time t represents the time remaining to ball impact relative to the time of the data points used for the solution. The result is the predicted time to ball impact curve 804 in FIG. 8D.

While solving for time to ball impact curve 804, the trigger delta-t is determined by look up table from information stored in PROM 712 using the club face 705 approach velocity from curve 802. Curve 802 shows a club face 705 approach velocity of 200 inches per second at 809. This equals 16.6 feet per second, just prior to ball impact at point 809. Curve 501 of FIG. 5 represents the ball velocity vs. trigger delta-t for this approach velocity of 16.6 feet per second. With a desired ball velocity of 225 feet per second, curve 501 crosses through 225 feet per second at point 508 at a trigger delta-t of 0.0026 seconds. The pretrigger time 814 is when the predicted time to ball impact curve 804 equals the trigger delta-t of 0.0026 seconds prior to impact which occurs at point 813 of curve 804, approximately 1.6666 seconds after the beginning of the swing, and 0.0026 seconds prior to ball impact 812.

At time 814 on FIG. 8D, the firing command would be given by DSP 711 which would cause DAC 713 to open valve 717 releasing compressed gas stored in reservoir 716 onto piston 718 in cylinder 719. Piston 718, connecting rod 720 and club face 705 would then accelerate toward ball 706. Club face 705 would then impact ball 706 causing it to accelerate to the desired velocity of 225 feet per second.

As a practical matter, the club head rotates during a golf swing. This causes accelerometer 702 to sense the acceleration of gravity and other accelerations as well as the desired motion. These potential sources of error can be accommodated by additional accelerometers, for example accelerometers 703 and 704 sensing acceleration in other directions as shown in FIG. 7. Using all three accelerometers 702, 703 and 704, the effects of gravity and other error signals can be significantly reduced. This gives a more accurate prediction of time to impact curve 804. Adding an additional tri-axial accelerometer 728 on handle 707 provides three additional acceleration inputs spaced apart from accelerometers 702, 703, and 704. This allows for determination of angular accelerations as well as linear accelerations, and allows for still more accurate determination of time to ball impact curve 804. The details of using additional accelerometers for gravity and other acceleration compensation are not presented since it is well known in the art. As a reference, U.S. Pat. No. 6,441,745 B1 to Gates, teaches the use of multiple accelerometers mounted on a golf club for compensating for the effects of gravity, to determine club head velocity for swing diagnostic purposes.

Description of FIG. 9

FIG. 9 is a summary flow chart of the sequence of events during the use of the embodiment of FIG. 7 as follows.

REF. DESCRIPTION

901 Input desired velocity or distance with switch 710.
902 Address the ball placing club face 705 touching ball 706.
903 Press starting switch 709.
904 Hold club head 701 still and wait 0.5 seconds for signal to begin swing.
905 Velocity integrator 714 integrates acceleration data into velocity data.
906 Distance integrator 715 integrates velocity data into distance data.
907 Look up trigger delta-t data for club head approach speed.
908 Determine predicted time at impact.
909 Determine pretrigger time.
910 Initiate firing command to open valve 717.
911 Impact ball 706.

Figure 9A:
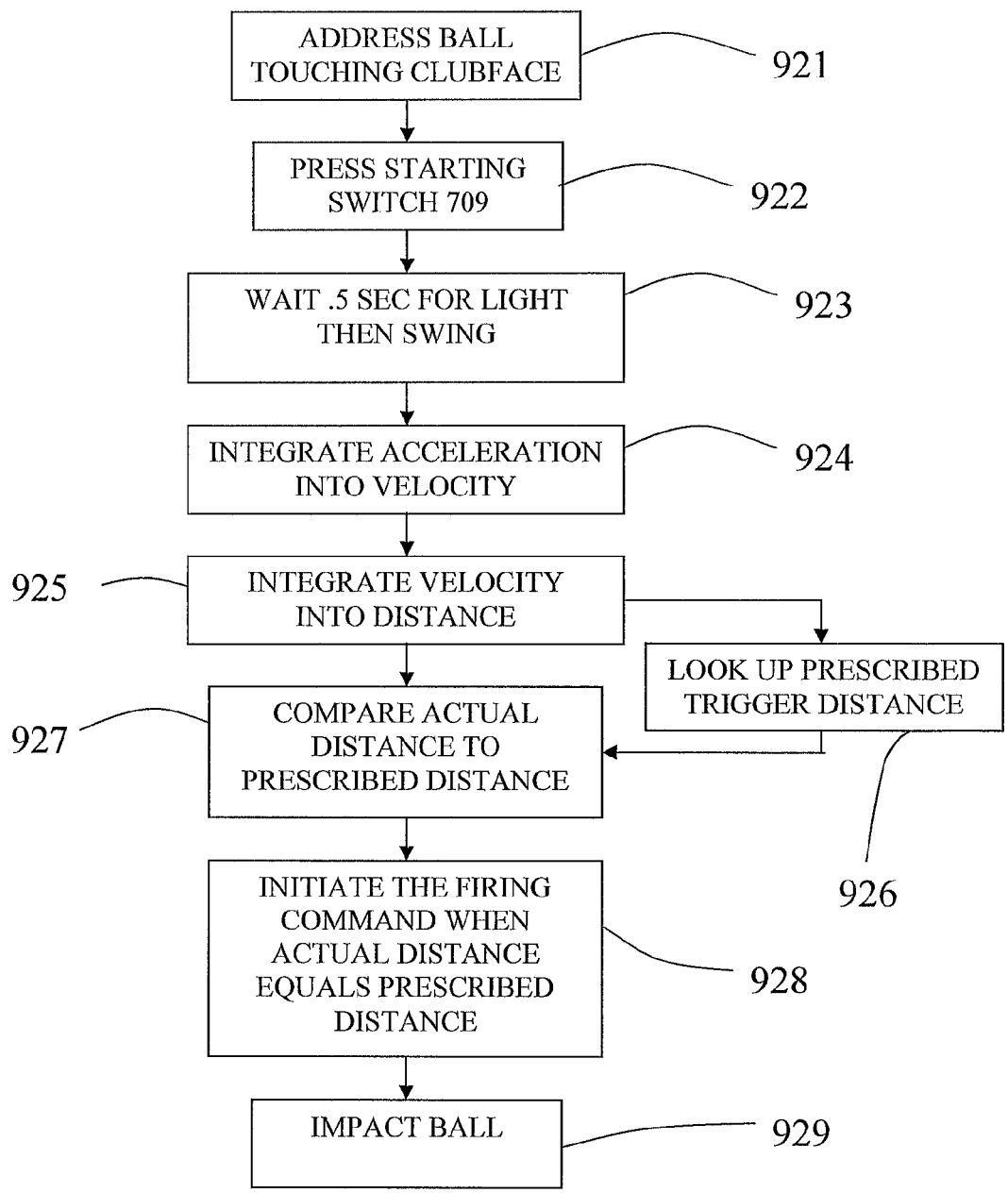
FIG. 9A is a flow chart showing the sequence of events while using the apparatus of the embodiment of FIG. 7 using a simplified alternative signal processing method.

Description of FIG. 9A

The example just described for the embodiment of FIG. 7 included the ability to accurately specify the resulting ball velocity either as a fixed value or as a user specified value. If an accurately specified ball velocity is not required but only an approximate velocity, then the signal processing means can be simplified by using distance to ball impact as the approach parameter to determine when to give the firing command as follows. Instead of calculating the exact time to give the firing command, the firing command is given when the distance curve 803 equals a specified distance value during the downswing. For example a distance of 0.5 inches in advance of ball impact gives good results in many cases. The simplification results from not having to look up stored characterization information from PROM 712 solve the quadratic equation 4, determine the trigger delta-t, and the exact time to give the firing command. Instead, distance curve 803 is directly compared by DSP 711 to a prescribed distance value stored in PROM 712. The firing command is given when the distance curve 803 equals the prescribed value during the downswing.

For this example, we can calculate the resulting ball velocity using this simplified procedure by using characterization curve 501 of FIG. 5. At a club face approach velocity of 16.6 feet per second or 200 inches per second, giving the firing command at a distance of 0.5 inches in advance of ball impact is the same as using a delta-t time of 0.0025 seconds since 0.5 inches divided by 200 inches per second equals 0.0025 seconds. This is indicated by point 509 on curve 501 of FIG. 5 and indicates a resulting ball velocity of approximately 224 feet per second, very close to the desired velocity of 225 feet per second. Therefore the optimum pretrigger time can be based on either time to ball impact, distance to ball impact, or some other approach parameter determined prior to ball impact.

FIG. 9A is a summary flow chart of the sequence of events during the use of the embodiment of FIG. 7 using the simplified alternative signal processing method just described as follows.

REF DESCRIPTION

- 921 Address the ball placing club face 705 near or touching ball 706.
- 922 Press starting switch 709.
- 923 Hold club 701 still and wait 0.5 seconds for light, then begin swing.
- 924 Velocity integrator 714 integrates acceleration data into velocity data.
- 925 Distance integrator 715 integrates velocity data into distance data.
- 926 Look up prescribed pretrigger distance.
- 927 Compare actual distance 803 to prescribed distance.
- 928 Give firing command when actual distance equals prescribed distance.
- 929 Impact Ball.

Figure 10:
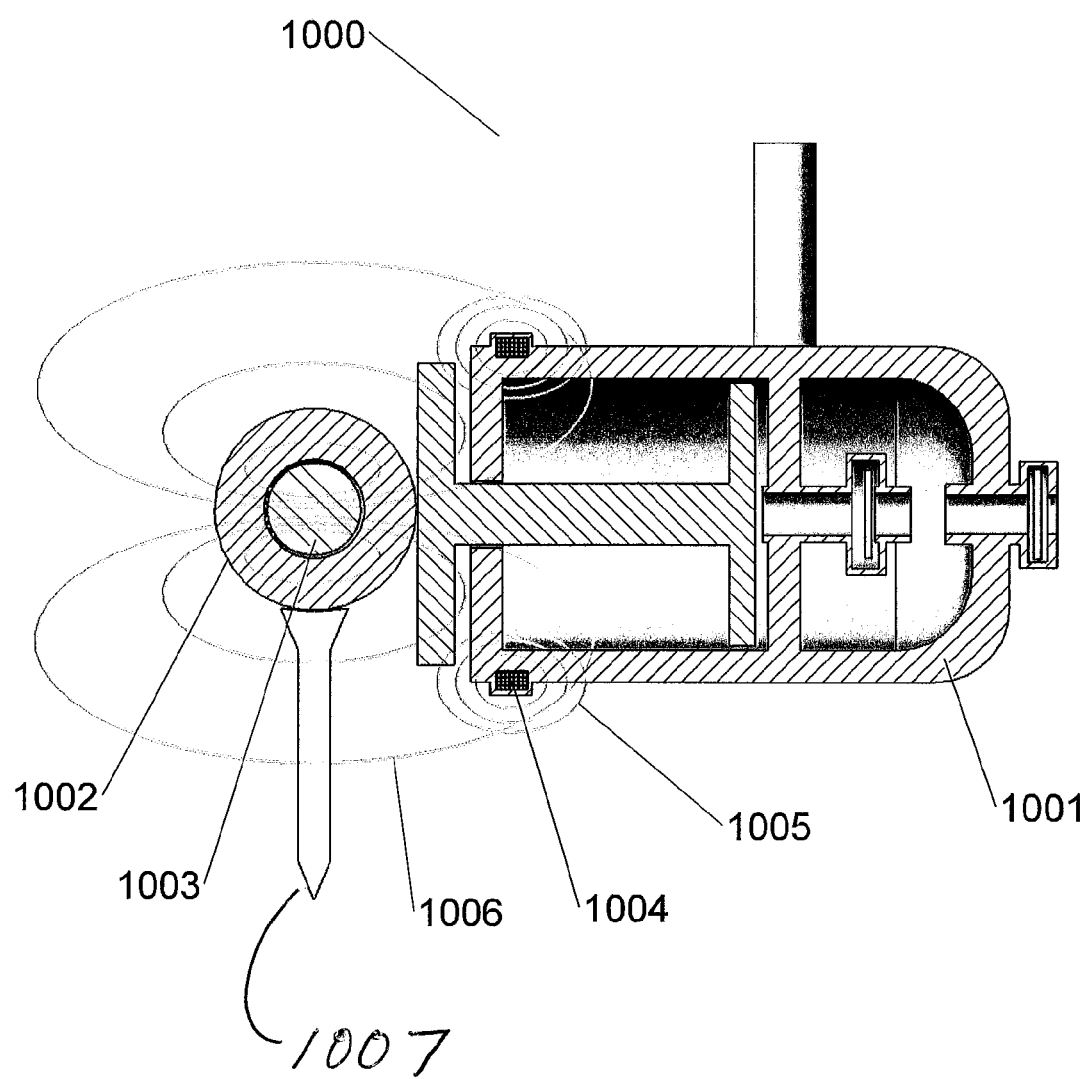
FIG. 10 is a cross section view of another possible exemplary embodiment of the present invention showing the use of a metal detection sensor with a metal core golf ball.

Description of FIG. 10

FIG. 10 is a cross section view of another possible exemplary embodiment of the invention comprising a golf club 1000 having a club head 1001 that uses compressed gas type assistive energy as was described for the embodiments of FIGS. 1 and 7. Club 1000 also includes metal detection sensor 1004 to sense golf ball 1002 having a metal core 1003. Commercially available metal core golf balls include Dunlop DDH 110 Steelcore, Top Flite XL 2000 Extra Long, Wilson Ultra Metal Matrix Distance, Pinnacle Titanium Extreme, Maxfli MD 90 Tungsten, and others which are commonly available.

Metal detection circuitry is well known and is not detailed here except for the primary sensing elements which are adapted for use by club head 1001. The sensing portion of the metal detection circuit includes coil 1004 which acts to transmit electromagnetic field 1005. Field 1005 interacts with metal core 1003 in ball 1002 causing induced field 1006. Coil 1004 senses induced field 1006 by using the pulse induction method of metal detection as is known in the art. The magnitude of induced field 1006 as sensed by coil 1004 is related to the distance between club 1001 and ball 1002 and can be used for the distance data in equations 1 and 2 to determine approach velocity and time at ball impact as earlier explained for the embodiment in FIG. 1. The mathematics to determine the optimum pretrigger time proceeds as earlier explained for the embodiments in FIGS. 1 and 7. As an alternative to having a golf ball with a metal core, a metal golf tee could also be used. The metal detection method just described would then detect the proximity of the metal of the golf tee which would give the same results as detecting the metal in a metal core ball.

Figure 11:
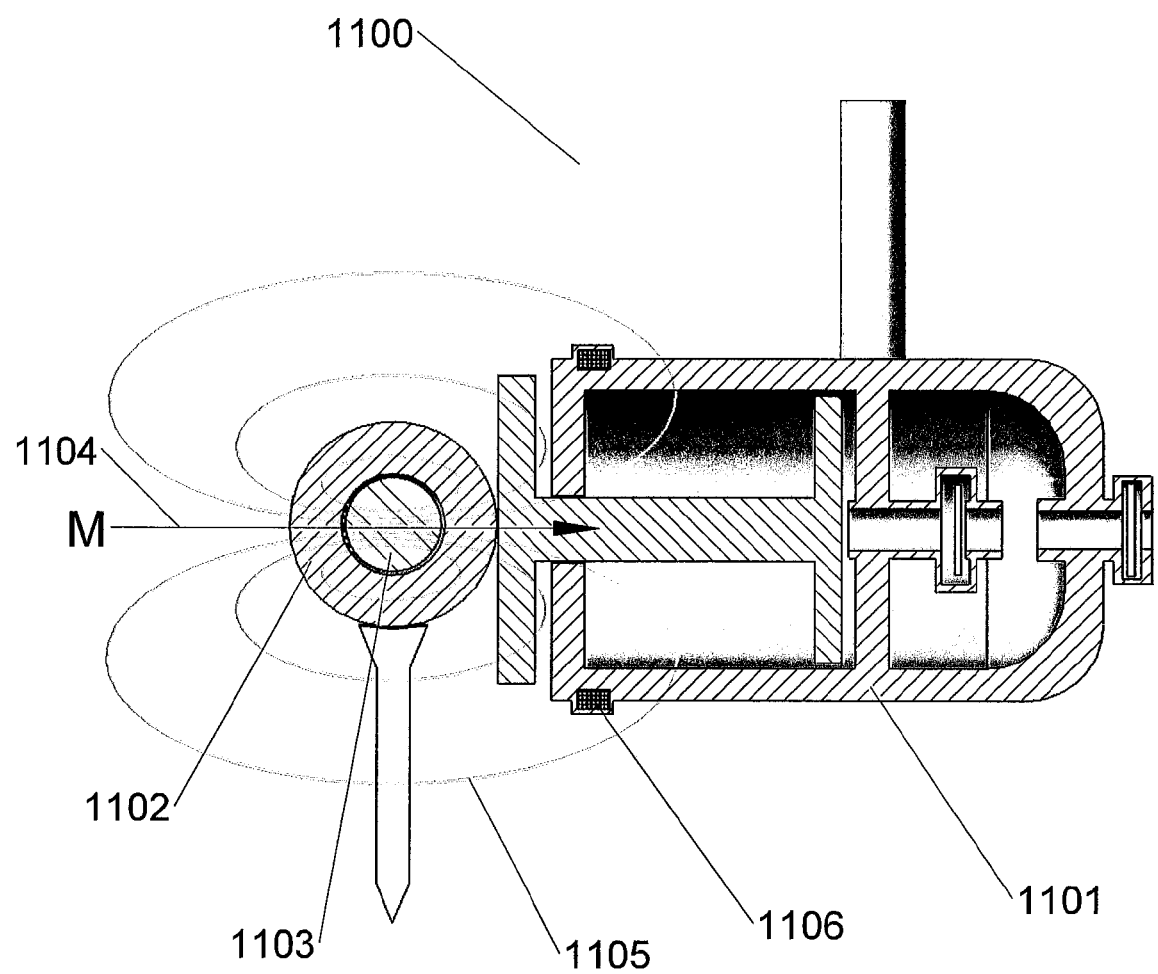
FIG. 11 is a cross section view of another possible exemplary embodiment of the present invention showing the use of magnetic detection sensors with a magnetized core golf ball.

Description of FIG. 11

FIG. 11 is a cross section view of another possible exemplary embodiment of the invention comprising golf club 1100 having club head 1101 that uses compressed gas type assistive energy as was described for the embodiments of FIGS. 1 and 7. Club head 1101 also includes a magnetic sensing apparatus to sense the velocity of club head 1101 relative to ball 1102. Club head 1101 works in combination with ball 1102 which has a magnetized core 1103 which creates magnetic field 1105. The proper alignment 1104 of magnetic field 1105 of ball 1102 is directed along the axis of coil 1106 and can be visually aligned using markings (not shown) on the outside of ball 1102. Motion of club 1101 away from ball 1102 will reduce the amount of field 1105 that passes through coil 1106 thus creating a voltage in coil 1106 having a magnitude related to the velocity of club head 1101. This velocity information can then be integrated into distance information, and differentiated into acceleration information thus creating curves analogous to curves 801, 802 and 803 of FIGS. 8A, 8B, and 8C respectively. The mathematics of determining the optimum pretrigger time then proceeds as for the embodiment of FIG. 7 using equation 4.

Figure 12:
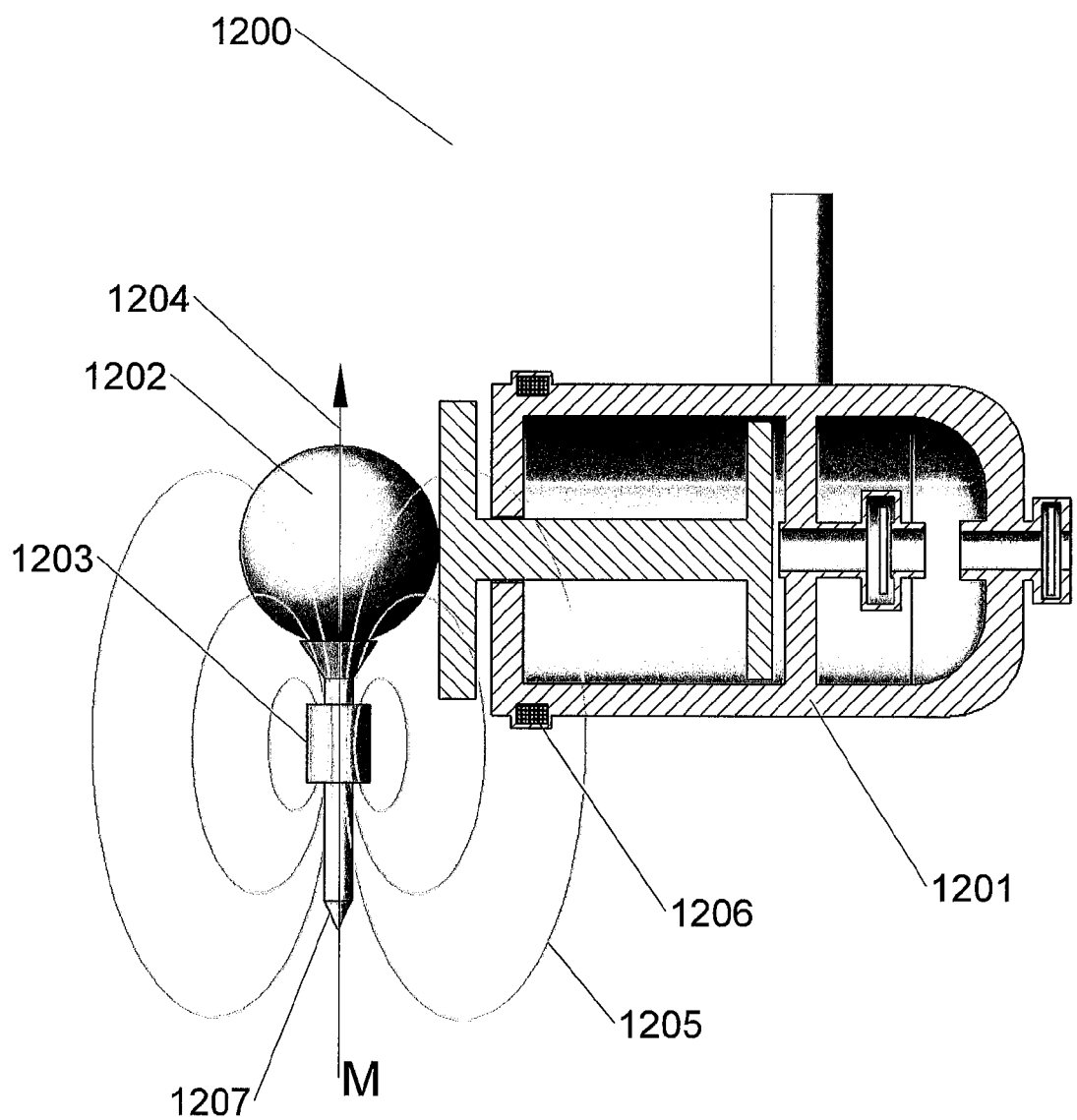
FIG. 12 is a cross section view of another possible exemplary embodiment of the present invention showing the use of electromagnetic detection sensors with an electromagnetic field generator attached to a tee holding the ball.

Description of FIG. 12

FIG. 12 is a cross section view of another possible exemplary embodiment of the invention comprising a golf club 1200 having a club head 1201 that uses electromagnetic sensing to sense the proximity of club head 1201 relative to ball 1202 by using an electromagnetic field generator 1203 attached to a tee 1207. Field generator 1203 could be a permanent magnet creating a permanent magnetic field 1205. Field generator 1203 could also be an electromagnetic coil creating an AC or pulsatory electromagnetic field 1205. The proper alignment 1204 of field 1205 is directed so that a portion of field 1205 is linked through coil 1206. Motion of club 1201 away from ball 1202 will reduce the amount of field 1205 that is linked through coil 1206. This reduction in field 1205 sensed by coil 1206 can then be related to the proximity of club 1201 relative to ball 1202. The mathematics of determining the optimum pretrigger time then proceeds in the same way as described previously for the embodiments of FIGS. 1 and 7.

Figure 13:
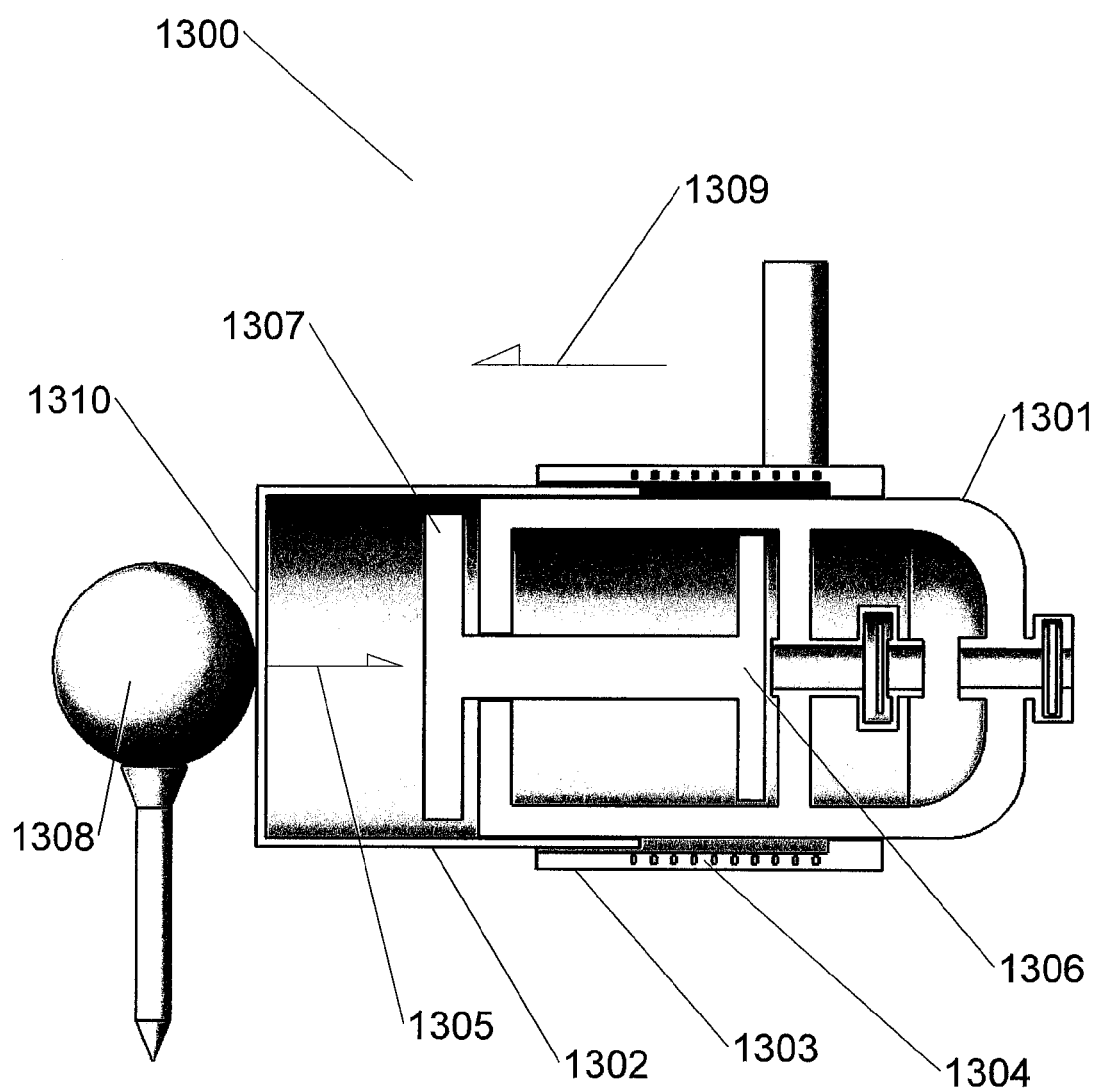
FIG. 13 is a cross section view of another possible exemplary embodiment of the present invention showing the use of a physical contact type ball proximity sensor.

Description of FIG. 13

FIG. 13 is a cross section view of another possible exemplary embodiment of the invention comprising golf club 1300 having a club head 1301 which senses the proximity of ball 1308 by physical contact of a lightweight slider 1302 prior to ball 1308 contacting club face 1307. Club head 1301 includes slider 1302, slider receiver 1303, and slider sensors 1304 which act together to sense the approach of club face 1307 toward ball 1308 by physical contact. During a normal golf swing club head 1301 moves along 1309 toward ball 1308. The contact face 1310 of slider 1302 is initially spaced at a distance, for example one inch, in front of club face 1307 so that the contact face 1310 of slider 1302 first contacts ball 1308 one inch prior to club face 1307. Slider 1302 is designed to be light weight and to stop its forward motion upon contacting ball 1308 and slide easily into slider receiver 1303 without applying a significant force onto ball 1308. Slider sensors 1304 positioned along slider receiver 1303 sense the position of slider 1302 as it moves in the direction 1305 relative to slider receiver 1303. Signals from slider sensors 1304 can then be used as ball position vs. time data points analogous to points 305, 306, and 307 on curve 301 of FIG. 4. The mathematics for determining the pretrigger time or distance then proceeds exactly as it did for the embodiment of FIG. 1 using either time to impact or distance to impact as an approach parameter to determine the optimum pretrigger time.

A firing command is then given based on the pretrigger time causing piston 1306 to accelerate club face 1307 to impact the back side of contact face 1310 of slider 1302 thus transmitting its assistive energy through contact face 1310 of slider 1302 into ball 1308 and accelerating it to the desired velocity.

Discussion of Remotely Mounted Sensors and Alternate Embodiments

The embodiments discussed until now have all had sensing means attached directly to a club head. This is not a necessary feature since remote sensors and signal processors could also be used. For example an ultrasonic, laser, radar or other type sensor could be placed on the ground and aimed to sense the motion of the club head during a swing. This would be analogous to a radar gun remotely sensing the motion of a moving vehicle. This motion information could further be processed remotely resulting in a pretrigger time. This pretrigger time would then be transmitted back to the club to release the assistive energy to impact the ball at the optimum time.

The embodiments discussed until now have all had sensing means comprised of one type of sensor for example an accelerometer which senses acceleration. It is also possible to use a combination of sensor types for example a combination of an accelerometer, a velocity sensor, and a distance sensor which together can supply acceleration, velocity, and distance signals analogous to curves 801, 802, and 803 respectively.

It is anticipated that many other embodiments including alternate approach parameters on which to base the determination of pretrigger time, alternate sensor technologies, and alternate signal processing apparatus and methods not herein described can be devised and used without exceeding the scope of the present invention.

The invention claimed is:

1. Apparatus adapted to control the operation of an assistive energy golf club head during a swing wherein said assistive energy is additive to the swing energy, said apparatus including:
   sensor apparatus adapted to sense the travel of said golf club head relative to a golf ball;
   signal processing apparatus operating to generate a firing command during said swing and prior to the impact of said golf club head with said golf ball based on a predicted impact time or impact distance of said golf club face with said golf ball;
   velocity generating apparatus including said golf club head responsive to said generation of said firing command to apply said assistive energy additive to the swing energy from said golf club face to said golf ball; and
   said assistive energy additive to the swing energy is effective to apply incremental velocity to said golf ball.

2. The apparatus of claim 1 wherein said sensor apparatus is chosen from the following group;
   an ultrasonic sensor, a laser sensor, a radar sensor, an accelerometer sensor, a magnetic sensor, an electromagnetic sensor, a contacting sensor, a light emitting diode sensor, and a metal detector sensor;
   said sensor apparatus is further effective during said swing to determine the present distance or velocity of said golf club face toward said golf ball; and
   said signal processing apparatus is further responsive to a determination of said present distance or velocity to determine when to generate said firing command.

3. The apparatus of claim 1 further comprising apparatus that enables a user to control the velocity or distance of said golf ball resulting from said impact.

4. The apparatus of claim 1 wherein said assistive energy is stored in said golf club;
   said firing command is effective only on the downswing portion of said swing;
   said firing command is effective only if limiting values of prescribed swing conditions are met;
   said prescribed swing conditions are chosen singly or in combination from a list including:
   swing distance,
   swing velocity,
   swing acceleration,
   initial club head starting position relative to said golf ball,
   elapsed time during said golf swing,
   club orientation relative to gravity, and
   club head random motion;
   said signal processing apparatus distinguishes between motion of said golf club head representing a backswing and random motion of said golf club head; and
   said signal processing apparatus is further affective to inhibit the generation of said firing command upon a determination of random motion of said golf club head.

5. The apparatus of claim 1 wherein;
   said sensor apparatus comprises one or more accelerometers that determine the acceleration of said club head;
   the velocity of said club head is determined by integrating said acceleration; and
   the present distance of said club head is determined by integrating said velocity.

6. A method of operating apparatus adapted to control the operation of an assistive energy golf club head during a swing, where said assistive energy is additive to the swing energy, said method including the steps of:
   operating sensor apparatus to sense the travel of said golf club head relative to a golf ball during said swing:
   operating signal processing apparatus responsive to said sensor apparatus during said swing and prior to the impact of said golf club head with said golf ball to determine a predicted time or distance to said impact;
   generating a firing command based on said predicted time or distance to ball impact, during said swing and prior to the impact of the club face of said golf club head with said golf ball;
   applying assistive energy additive to the swing energy from said golf club face to said golf ball responsive to said generation of said firing command; and
   said assistive energy additive to the swing energy is effective to apply incremental velocity to said golf ball.

7. The method of claim 6 wherein said sensor apparatus is chosen singly or in combination from the following group;
   an ultrasonic sensor, a laser sensor, a radar sensor, an accelerometer sensor, a magnetic sensor, an electromagnetic sensor, a contacting sensor, a light emitting diode sensor, and a metal detector sensor.

8. The method of claim 6 comprising the further step of enabling a user to control the velocity or distance of said golf ball resulting from said impact.

9. The method of claim 6 including the steps of;
   generating said firing command only if limiting values of prescribed swing conditions are met during said swing;
   choosing said prescribed swing conditions singly or in combination from a list including;
   swing distance,
   swing velocity,
   swing acceleration, initial club head starting position relative to said golf ball elapsed time during said golf swing, club orientation relative to gravity, and club head random motion.

10. The method of claim 6 including the step of operating said signal processing apparatus during the backswing portion of said swing to distinguish between motion of said golf club head representing a backswing and random motion of said golf club head; and inhibiting the generation of said firing command upon a determination of random motion of said golf club head.

11. The method of claim 6 wherein said sensor apparatus comprises an accelerometer sensor, said golf club is equipped with an alerting apparatus adapted to provide an audio, visual or vibratory signal to a user when it is time to initiate said swing, said method comprises the further steps of:

positioning said club head proximate said golf ball in a rest position;

maintaining said club head motionless and proximate said golf ball;

operating said alerting apparatus when said club head has remained motionless for a time duration adequate to enable said signal processing apparatus to determine the at rest position of said golf ball; and operating said alerting apparatus to generate an alert signal to advise said user that the swing of said golf club may begin.

* * * * *